US012013110B2

(12) United States Patent
Butcher

(10) Patent No.: US 12,013,110 B2
(45) **Date of Patent: *Jun. 18, 2024**

(54) LIGHTING DEVICES INCLUDING AT LEAST ONE LIGHT-EMITTING DEVICE, SYSTEMS INCLUDING AT LEAST ONE LIGHTING DEVICE, AND RELATED METHODS

(71) Applicant: LIQUID LUMENS, LLC, Salt Lake City, UT (US)

(72) Inventor: Trent Neil Butcher, Sandy, UT (US)

(73) Assignee: LIQUID LUMENS, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,061

(22) Filed: Nov. 16, 2022

(65) Prior Publication Data

US 2023/0078807 A1 Mar. 16, 2023

Related U.S. Application Data

(63) Continuation of application No. 17/405,595, filed on Aug. 18, 2021, now Pat. No. 11,549,678, which is a (Continued)

(51) Int. Cl.

| | |
|---|---|
| ***F21V 31/00*** | (2006.01) |
| ***B63B 45/00*** | (2006.01) |
| ***B63B 45/02*** | (2006.01) |
| ***B63B 45/04*** | (2006.01) |
| ***F21S 9/02*** | (2006.01) |

(Continued)

(52) U.S. Cl.

CPC ............ *F21V 31/005* (2013.01); *B63B 45/02* (2013.01); *B63B 45/04* (2013.01); *F21V 5/04* (2013.01); *F21V 23/001* (2013.01); *B63B 2045/005* (2013.01); *F21S 9/02* (2013.01); *F21V 19/003* (2013.01); *F21V 29/507* (2015.01); *F21V 29/56* (2015.01); *F21V 29/60* (2015.01); *F21V 29/83* (2015.01); *F21Y 2113/10* (2016.08); *F21Y 2115/10* (2016.08)

(58) Field of Classification Search

CPC ......... B63B 45/00–06; B63B 2045/005; F21S 9/00–046; F21V 5/04–048; F21V 19/00–0055; F21V 23/00–009; F21V 29/507–508; F21V 29/56–65; F21V 29/83; F21Y 2113/10; F21Y 2115/10

See application file for complete search history.

(56) References Cited

U.S. PATENT DOCUMENTS

2018/0009513 A1* 1/2018 Christensen .......... F21V 31/005

* cited by examiner

*Primary Examiner* — Jason M Han

(74) *Attorney, Agent, or Firm* — Workman Nydegger

(57) ABSTRACT

In some embodiments, a lighting assembly including at least one light-emitting device positioned within a housing is disclosed, wherein the housing is designed to allow an ambient environment to pass into the housing and transfer heat from the at least one light-emitting device. The light-emitting area of the light-emitting device may be sealed from the ambient environment. In some embodiments, the housing may include at least one recess, port, or other opening configured to allow a liquid or gas to promote heat transfer from the light-emitting device. In some embodiments, a vehicle, a marine system, or other systems may include at least one lighting assembly as contemplated herein.

23 Claims, 17 Drawing Sheets

Related U.S. Application Data continuation of application No. 16/799,856, filed on Feb. 25, 2020, now Pat. No. 11,112,105, which is a continuation of application No. 16/601,574, filed on Oct. 14, 2019, now Pat. No. 10,612,765, which is a continuation of application No. 16/128,447, filed on Sep. 11, 2018, now Pat. No. 10,443,835, which is a continuation of application No. 15/261,432, filed on Sep. 9, 2016, now Pat. No. 10,077,896.

(60) Provisional application No. 62/218,556, filed on Sep. 14, 2015.

(51) Int. Cl.

| | |
|---|---|
| ***F21V 5/04*** | (2006.01) |
| ***F21V 19/00*** | (2006.01) |
| ***F21V 23/00*** | (2015.01) |
| ***F21V 29/507*** | (2015.01) |
| ***F21V 29/56*** | (2015.01) |
| ***F21V 29/60*** | (2015.01) |
| ***F21V 29/83*** | (2015.01) |
| ***F21Y 113/10*** | (2016.01) |
| ***F21Y 115/10*** | (2016.01) |

LIGHTING DEVICES INCLUDING AT LEAST ONE LIGHT-EMITTING DEVICE, SYSTEMS INCLUDING AT LEAST ONE LIGHTING DEVICE, AND RELATED METHODS

CROSS REFERENCE TO RELATED APPLICATIONS

This application is a continuation of U.S. patent application Ser. No. 17/405,595, titled "LIGHTING DEVICES INCLUDING AT LEAST ONE LIGHT-EMITTING DEVICE, SYSTEMS INCLUDING AT LEAST ONE LIGHTING DEVICE, AND RELATED METHODS" and filed 18 Aug. 2021, which is a continuation of U.S. patent application Ser. No. 16/799,856, titled "LIGHTING DEVICES INCLUDING AT LEAST ONE LIGHT-EMITTING DEVICE, SYSTEMS INCLUDING AT LEAST ONE LIGHTING DEVICE, AND RELATED METHODS" and filed 25 Feb. 2020, which is a continuation of U.S. patent application Ser. No. 16/601,574, titled "LIGHTING DEVICES INCLUDING AT LEAST ONE LIGHT-EMITTING DEVICE, SYSTEMS INCLUDING AT LEAST ONE LIGHTING DEVICE, AND RELATED METHODS" and filed 14 Oct. 2019, which is a continuation of U.S. patent application Ser. No. 16/128,447, titled "LIGHTING DEVICES INCLUDING AT LEAST ONE LIGHT-EMITTING DEVICE, SYSTEMS INCLUDING AT LEAST ONE LIGHTING DEVICE, AND RELATED METHODS" and filed 11 Sep. 2018, which is a continuation of U.S. patent application Ser. No. 15/261,432, titled "LIGHTING DEVICES INCLUDING AT LEAST ONE LIGHT-EMITTING DEVICE AND SYSTEMS INCLUDING AT LEAST ONE LIGHTING DEVICE" and filed 9 Sep. 2016, which claims the benefit of U.S. Provisional Patent Application No. 62/218,556, titled "LIGHTING DEVICES INCLUDING AT LEAST ONE LIGHT-EMITTING DEVICE, SYSTEMS INCLUDING AT LEAST ONE LIGHTING DEVICE, AND RELATED METHODS" and filed 14 Sep. 2015, each of which is hereby incorporated by reference in its entirety.

BACKGROUND

Some conventional lighting fixtures are limited to indoor use, while others may be used outdoors or even underwater.

Lighting fixtures including at least one chip-on-board light emitting diode ("COB LED") are becoming more widely used. COB LED technology allows the LED modules to be clusters on circuit boards or substrates. In some configurations, the LED may be bonded directly to a substrate (e.g., a metal substrate). Compared to traditional lighting, COB LED modules are extremely bright for the small space they occupy. COB LEDs, in some cases, outperform traditional lighting by up to 50 times the light output per square centimeter of light surface. COB technology provides significant advantages over traditional surface mount technology (SMT). COB LEDs generally provide better temperature management, smaller LED modules, greater lumen output, and lower production costs.

COB LEDs typically provide reliable light emission from a relatively small physical device. However, COB LEDs also generate substantial heat when in operation, and unless such heat is adequately dissipated, this heat energy may, in some situations, cause the LED, or materials nearby, to be damaged or destroyed.

SUMMARY

The invention relates to a lighting assembly including at least one light-emitting device positioned within a housing, wherein the housing is designed to allow an ambient environment to pass into the housing and transfer heat from the at least one light-emitting device. For example, embodiments of the present invention generally relate to a lighting assembly including at least one light-emitting device positioned within a housing such that a light-emitting area of the light-emitting device is sealed from ambient conditions. However, embodiments of the present invention also relate to promoting the transfer of heat from a back surface of the substrate of the light-emitting device. In some embodiments, the housing may include at least one recess, port, or other opening configured to allow a liquid or gas to promote heat transfer from the light-emitting device.

In one embodiment, a lighting assembly may comprise a housing and at least one light-emitting device comprising a substrate and a light-emitting area formed over or upon at least a portion of the substrate. Such at least one light-emitting device may be positioned at least partially within the housing. Further, the housing may include at least one port configured to allow an ambient environment to contact the substrate. In addition, the light-emitting area of the light-emitting device may be sealed from the ambient environment. A marine system (e.g., a marine vehicle such as, for example, a yacht, a boat, an underwater robot, an autonomous underwater vehicle, a remotely-operated vehicle, a diver propulsion vehicle, a submarine, or a personal watercraft) may include at least one lighting assembly as contemplated herein.

Features from any of the disclosed embodiments may be used in combination with one another, without limitation. In addition, other embodiments, features, and advantages of the present disclosure will become apparent to those of ordinary skill in the art through consideration of the following detailed description and the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

Figure 1A:
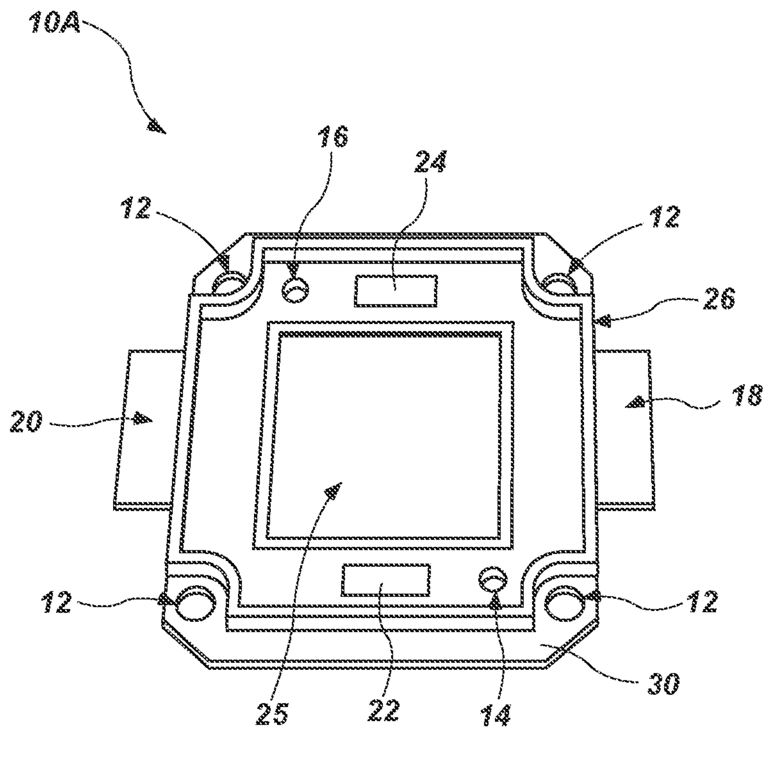
FIG. 1A shows a perspective view of one embodiment of a COB LED.

FIG. 1A shows a perspective view of one embodiment of a COB LED 10A. As shown in FIG. 1A, COB LED 10A generally includes a light-emitting area 25, a substrate 30, and a template 26. Light-emitting area 25 may comprise small semiconductor crystals bonded directly to at least a portion of the substrate 30 or in close proximity to the substrate (e.g., over at least a portion of the substrate). For example, in some embodiments, light-emitting area 25 may comprise diodes such as light-emitting diodes (LEDs) or organic light-emitting diodes ("OLEDs"). Such LEDs may include one or more of a variety of components (e.g., P-type semiconductors, N-type semiconductors semiconductor films, such as Gallium Nitride films, etc.) that emit light (e.g., visible light, infrared light, ultraviolet light, etc.) when a voltage is applied thereto. During use, the light-emitting area 25 (e.g., LEDs included in light-emitting area 25) may produce significant heat. In some embodiments, the substrate 30 may be a metal (e.g., aluminum, copper, etc.). Further, substrate 30 of COB LED 10A may include mounting holes 12.

COB LED 10A may include electrical tabs 18 and 20, which may be configured for a selected electrical polarity (e.g., electrical tab 18 may be configured for a positive direct current electrical connection and electrical tab 20 may be configured for a negative direct current electrical connection, or vice versa). Similarly, solder pads 22 and 24 may be configured for a selected electrical polarity (e.g., solder tab 22 may be configured for a positive direct current electrical connection and solder tab 24 may be configured for a negative direct current electrical connection, or vice versa). Access holes 14 and 16 may allow for a respective conductor (e.g., a wire) to pass through the substrate 30 and electrically connect (e.g., be soldered) to solder pads 22 or solder pad 24. Usually, both solder pads 22 and 24 or both electrical tabs 18 and 20 may be used for electrical powering of COB LED 10A; however, one solder pad and one electrical tab (i.e., one positive and one negative) may be used for electrical powering of the COB LED 10A. Optionally, in some embodiments, electrical tabs 18 and 20 may be removed from the COB LED 10A and solder pads 22 and 24 may be used for electrical powering of COB LED 10A.

Although COB LED 10A is illustrated as having a generally square plate geometry, COB LED 10A may be any shape or size. For example, any light-emitting device (e.g., a COB LED) may exhibit/include one or more selected: shape (e.g., a disk-shaped geometry); size; electrical configuration (e.g., voltage and/or amperage); one or more color (e.g., red, white, blue, green, multiple colors (RGB), any selected one or more color, etc.); power consumption (e.g., at least about 50 watts, at least about 100 watts, at least about 200 watts, at least about 300 watts, at least about 400 watts, at least about 500 watts, greater than about 500 watts, between about 100 watts and about 300 watts, or between about 300 watts and about 500 watts); and/or light output. Such light-emitting device may be included in any of the embodiments disclosed herein. COB LEDs are commercially available from companies including, but not limited to, Luminus Devices (Woburn, Massachusetts), Philips Lumileds (San Jose, California), and Cree Inc. (Durham, North Carolina).

Figure 1B:
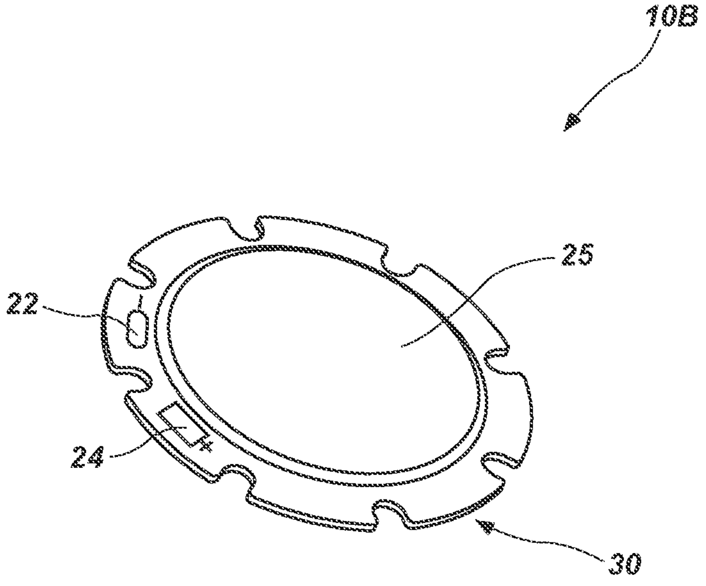
FIG. 1B shows a perspective view of another embodiment of a COB LED.

FIG. 1B shows a perspective view of an embodiment of a COB LED 10B. As shown in FIG. 1B, COB LED 10B generally includes a light-emitting area 25, a substrate 30, and a template 26. Light-emitting area 25 may comprise small semiconductor crystals bonded directly to at least a portion of the substrate 30 or in close proximity to the substrate (e.g., over at least a portion of the substrate). For example, in some embodiments, light-emitting area 25 may comprise diodes such as the light-emitting diodes (LEDs). Such LEDs may include one or more of a variety of components (e.g., P-type semiconductors or N-type semiconductors) that emit light (e.g., visible light, infrared light, ultraviolet light, or any wavelength of light) when a voltage is applied. During use, the light-emitting area 25 (e.g., LEDs included in light-emitting area 25) may produce significant heat. In some embodiments, the substrate 30 may be a metal (e.g., aluminum, copper, etc.). Further, substrate 30 of COB LED 10B may include mounting holes 12 (see, e.g., mounting holes 12 shown in FIG. 1A). COB LED 10B may include solder pads 22 and 24, which may be configured for a selected electrical polarity (e.g., solder pad 22 may be configured for a positive direct current electrical connection and solder pad 24 may be configured for a negative direct current electrical connection, or vice versa).

Figure 1C:
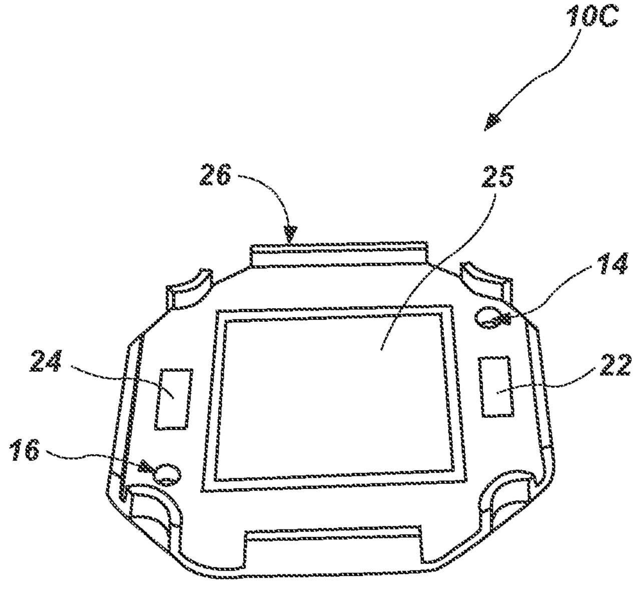
FIG. 1C shows a perspective view of a further embodiment of a COB LED.

FIG. 1C shows a perspective view of another embodiment of a COB LED 10C. COB LED 10C may be as described with respect to COB LED 10A, but with portions of COB LED 10A having been removed. Particularly, corner regions of COB LED 10A may be removed (e.g., by machining, milling, sawing, laser ablation, grinding, or any other suitable method) such that only certain portions of template 26 remain on COB LED 10C. Such a configuration may allow for COB LED 10C to fit within a selected housing, as will be described in greater detail hereinbelow. In one example, removal of portions of COB LED 10A to form COB LED 10C may follow a circular reference generally centered at or near the center of light-emitting area 25. In some embodiments, COB LED 10C may be substantially circular. As shown in FIG. 1C, COB LED 10C may include solder pads 22 and 24, which may be configured as described with respect to FIG. 1A.

For convenience, as used herein, "LED COB 10" may refer to one or more of COB LED 10A, COB LED 10B, or COB LED 10C. As will be explained in detail herein, embodiments of the present invention generally relate to a lighting assembly including at least one light-emitting device (e.g., at least one COB LED) positioned within a housing such that a light-emitting area of the light-emitting device is sealed from ambient conditions or an ambient environment (e.g., water in which the lighting assembly is at least partially submerged). In some embodiments, the housing may include at least one recess, port, or other opening configured to allow an ambient environment (e.g, a liquid and/or a gas) to promote heat transfer from the light-emitting device. Thus, embodiments of the present invention may relate to promoting the transfer of heat from a back surface of the substrate of the light-emitting device. Generally, the present invention contemplates light-emitting devices wherein greater than about 30%, greater than about 40%, or greater than about 50% of the predominant surface area of the substrate is covered by the light-emitting area. As shown in various figures herein, the light-emitting area may be formed over or upon a substantially planar surface of a substrate. Further, the present invention contemplates that the substrate may comprise a material with a relatively high thermal conductivity. For example, the substrate of a light-emitting device may comprise a material with a thermal conductivity greater than a thermal conductivity of iron, a material with a thermal conductivity greater than a thermal conductivity of nickel, or a material with a thermal conductivity greater than or equal to a thermal conductivity of tungsten. For example, a substrate may comprise graphite, copper, or aluminum.

Figure 2:
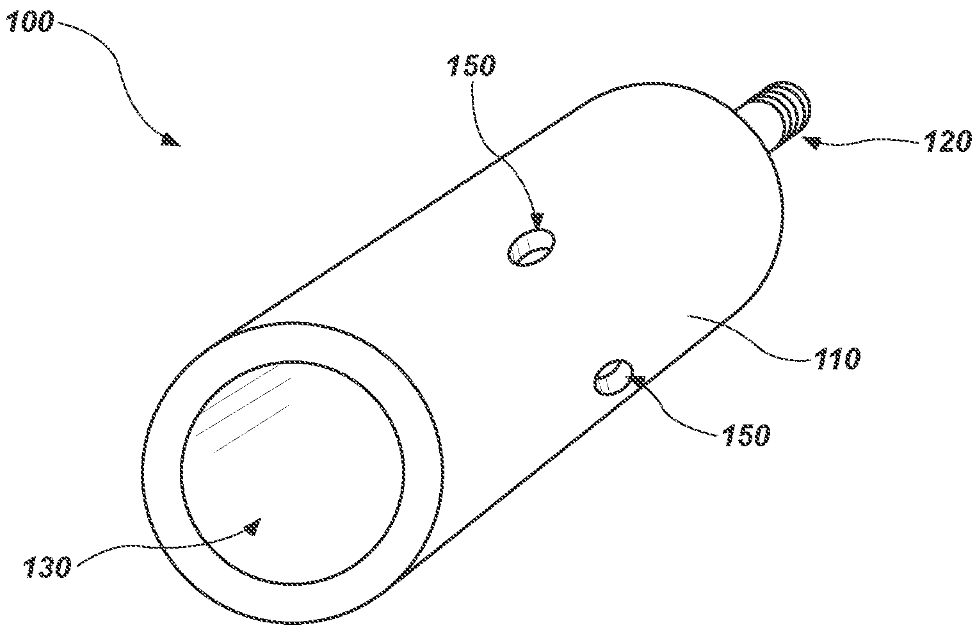
FIG. 2 shows a perspective view of a lighting assembly including one light-emitting device according to the present invention.
Figure 3:
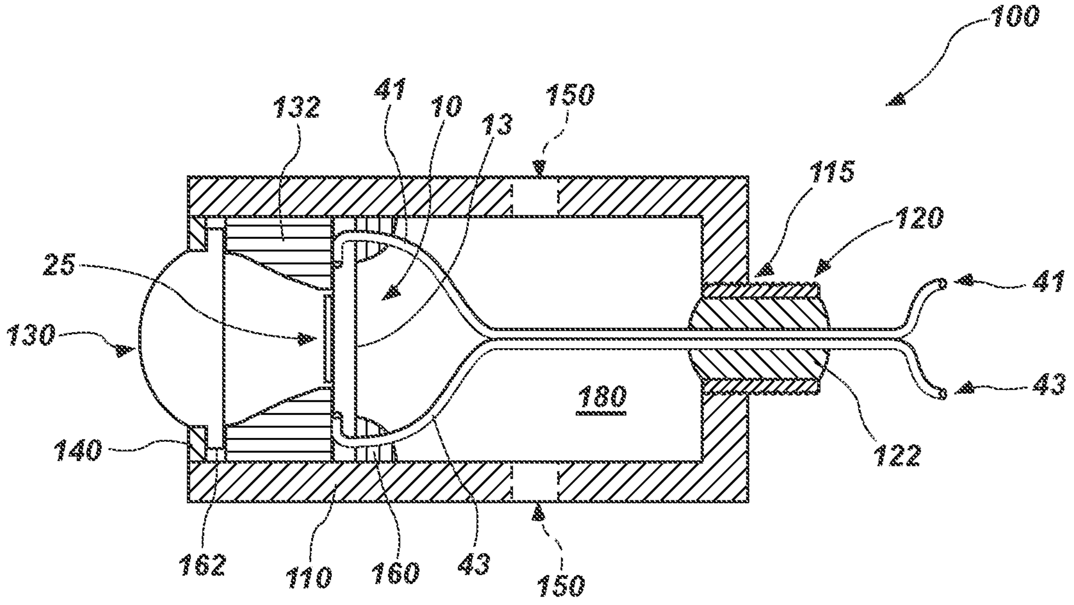
FIG. 3 shows a cross-sectional view of one embodiment of the lighting assembly shown in FIG. 2.

FIGS. 2 and 3 show a perspective view of a lighting assembly 100 and a cross-sectional view of a lighting assembly 100, respectively. As shown in FIGS. 2 and 3, in one embodiment, housing 110 may be generally cylindrical. In other embodiments, housing 110 may be cubic, spheroid, frusto-conical, and/or any selected shape. Housing 110 may comprise a polymer, a metal, a metal alloy, and/or any suitable material. For example, housing 110 may comprise a polymer (e.g., polyvinyl chloride (PVC)), any metal or metal alloy, brass, stainless steel, aluminum, and/or any other suitable material. The material(s) from which housing 110 is made may be selected to be resistant to corrosion (e.g., resistant to salt water or fresh water corrosion) and/or resistant to damage from exposure to sunlight.

As shown in FIGS. 2 and 3, COB LED 10 may be positioned within housing 110. Optionally, a portion of substrate 30 and/or template 26 may be removed (e.g., by machining, milling, grinding, sawing, cutting, etc.) from COB LED 10 (e.g., as described above relative to FIG. 1C) so that COB LED 10 fits within housing 110. In one embodiment, corner portions of a generally square COB LED 10 may be removed such that COB LED 10 fits within a generally cylindrical housing 110. Further, a reflector element 132 may be positioned adjacent to COB LED 10 such that a reflective opening of the reflector element 132 is positioned about light-emitting area 25. Reflector element 132 may comprise a plastic or polymer and may be coated with a reflective coating (e.g., a chrome coating). Lens element 130 may be positioned adjacent to reflector element 132. Lens element 130 may be substantially transparent. Accordingly, lens element 130 may comprise glass, a substantially transparent material, a substantially transparent plastic or polymer, and/or any other suitable material. Optionally, the reflective opening of reflector element 132 may be at least partially filled or substantially filled with a substantially transparent material (e.g., a substantially transparent silicone, a substantially transparent epoxy, a substantially transparent plastic or polymer, water glass, polycarbonate, acrylic, etc.). Thus, during operation, light-emitting area 25 may emit light, where such light may pass through (or is reflected from) reflective opening of reflector element 132 and may also pass through lens element 130. As may be appreciated, reflector element 132 and/or lens element 130 may be designed and/or configured to direct, focus, and/or diffuse emitted light in a certain direction, pattern, or shape. In some embodiments, more than one lens element may be used. More generally, at least one lens element may be operably configured and/or positioned with respect to at least one COB LED.

Sealant element 162 may provide a seal (e.g., against liquid or gas) between housing 110, lens element 130, and/or reflector element 132. In some embodiments, sealant element 162 may comprise a sealant material, such as, for example, epoxy, silicone, resin, or rubber. For example, sealant element 162 may comprise 3M™ Marine Adhesive Sealant 5200 (fast cure or standard cure). In other embodiments, sealant element 162 may comprise an a-ring, a washer, a wiper seal, or any other suitable sealing element. In some embodiments, retaining element 140 may be configured to compress sealant element 162 and/or lens element 130. For example, retaining element 140 may include a threaded exterior surface configured to threadedly engage a complementary threaded interior surface of housing 110. Accordingly, such a retaining element 140 may be rotated to compress sealant element 162 against housing 110 and/or reflector element 132. In other embodiments, retaining element 140 may be rotated to compress lens element 130 and sealant element 162 may be positioned between lens element 130 and reflector element 132. Optionally, multiple sealant elements 162 may be configured and positioned to create a liquid or gas seal between two or more of reflector element 132, housing 110, retaining element 140, and COB LED 10, without limitation.

In addition, sealant element 160 may comprise any configuration or material described above with respect to sealant element 162. However, sealant element 160 may be configured to seal between COB LED 10 and housing 110 (e.g., between a back surface 13 of substrate 30 and housing 110). Further, sealant element 160 (or another sealant element) may seal electrical conductors 41 and 43 (e.g., between electrical conductors 41 and 43 and housing and/or COB LED 10). Particularly, electrical conductors 41 and 43 may pass through substrate 30 to make electrical connections with COB LED 10 (as described above with reference to solder pads 22 and 24 illustrated in FIG. 1). In another embodiment, electrical conductors 41 and 43 may be at least partially embedded within housing 110 to at least partially protect or seal the electrical conductors 41 and 43. Electrical conductors 41 and 43 may comprise any suitable electrically conducting structure, such as, for example, insulated wire, wire, metal, a metal alloy, or any other suitable electrically conducting structure.

The present invention contemplates that COB LED 10 may be cooled by a liquid and/or gas in which lighting assembly 100 is exposed (e.g., at least partially submerged). Because the lighting assembly 100 may be at least partially submerged in a liquid, in general, lens element 130 may be sealed to prevent or inhibit such liquid from contacting COB LED 10 (e.g., light-emitting area 25 of COB LED 10). Further, electrical conductors 41 and 43 and a back surface 13 of COB LED 10 may be at least partially sealed to prevent or inhibit such liquid from contacting a front surface or electrical connections of COB LED 10 (e.g., light-emitting area 25 of COB LED 10). Explaining further, at least one port 150 may be formed in housing 110 to allow a liquid or gas in which lighting assembly 100 is exposed (e.g., at least partially submerged) to pass through. As shown in FIGS. 2 and 3, ports 150 may be configured to allow liquid and/or gas to pass into an interior chamber 180 of housing 110. Such liquid and/or gas may contact at least a portion of back surface 13 of COB LED 10 to provide cooling during operation of COB LED 10.

At least one port 150 may be sized and configured in any desired manner. For example, it may be desirable to have one port 150 that is larger than another port 150. In one embodiment, a larger port (not illustrated) may be positioned above (with respect to the direction of gravity) a smaller port (not illustrated). Such a configuration may retain liquid and/or gas in chamber 180 for a desired amount of time, for example, when lighting assembly 100 is initially submerged and then is temporarily not submerged (e.g., as may be the case if lighting assembly 100 is positioned in a rear transom drain of a boat, a yacht, or another marine vehicle). Further, at least one port 150 may be sized to inhibit marine organisms from entering interior chamber 180. In another embodiment, at least one port 150 may be sized to allow cleaning (e.g., via a brush or other cleaning implement) of interior chamber 180, substrate 30 of COB LED 10, or any other component positioned within interior chamber 180. Optionally, screens or filters may be positioned across or within at least one port 150 to filter or screen liquid and/or gas entering interior chamber 180.

As shown in FIG. 3, a portion of back surface 13 of COB LED 10 may be sealed by sealant element 160. Accordingly, in such an embodiment, only a portion of back surface 13 of COB LED 10 may be exposed to and may define a portion of interior chamber 180. Put another way, housing 110 and substrate 30 may collectively, generally define interior chamber 180. Thus, liquid and/or gas within interior chamber 180 may contact only a portion of back surface 13 of COB LED 10. In some embodiments, less than 95%, less than 90%, less than 85%, less than 80%, less than 70%, or less than 60% of back surface 13 of COB LED 10 may be exposed. In other embodiments, COB LED 10 may be sealed peripherally (e.g., along a side surface, such as along a side surface of substrate 30) to housing 110 and the entire back surface 13 of COB LED 10 maybe exposed. Any of the foregoing configurations may lengthen an operational life of COB LED 10 and/or may allow for relatively high power COB LED devices to be used in lighting assembly 100. In some embodiments, a COB LED 10 may have a power rating or consumption of greater than about 90 watts, greater than about 190 watts, greater than about 290 watts, between about 190 watts and about 350 watts, or greater than about 350 watts.

In a further aspect of the present invention, electrical conductors 41 and 43 may passthrough mounting component 120. Mounting component 120 may be configured to attach lighting assembly 100 to another structure (e.g., a watercraft, a boat, an automobile, a swimming pool, a fountain, an aquarium, etc.). In one example, mounting component 120 may be threaded on each end, such that one threaded end engages a threaded opening 115 of housing 110 and the other threaded end of mounting component 120 may be mounted to a threaded opening in another structure. In one embodiment, mounting component 120 may be sized and configured to mount to a drain plug port of a boat. In such an embodiment, mounting component may comprise a metal (e.g., brass, stainless steel, aluminum, or any suitable metal or metal alloy). For example, mounting component may comprise a brass nipple (e.g., a brass hex nipple) used for general plumbing applications. Also, as shown in FIG. 3, a plug element 122 may seal electrical conductors 41 and 43 and the interior of mounting component 120 to prevent or inhibit liquid or gas from leaking through mounting component 120.

Figure 4:
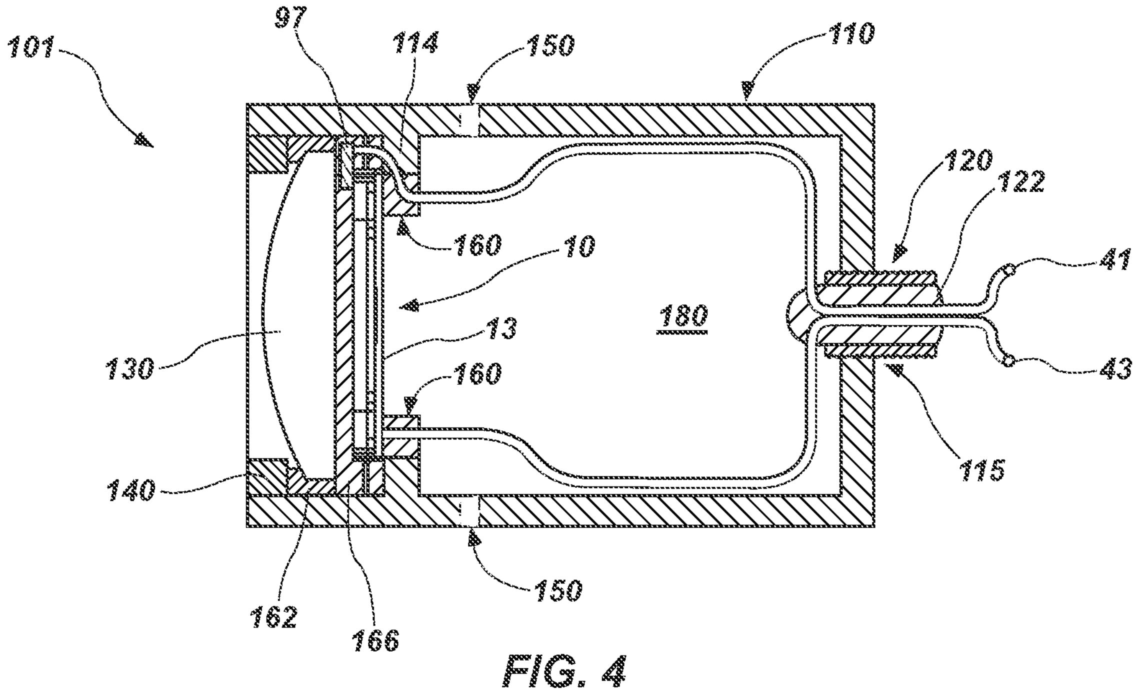
FIG. 4 shows a cross-sectional view of another embodiment of a lighting assembly according to the present invention.

FIG. 4 shows a partial cross-sectional view of another embodiment of a lighting assembly 101 according to the present invention. More particularly, the components and features (e.g., with the same reference numerals) of lighting assembly 107, as illustrated in FIG. 4, may be similar or identical to those components and features of lighting assembly 100 (illustrated in FIGS. 2 and 3). As shown in FIG. 4, COB LED 10 may be positioned within housing 110, where housing 110 includes a flange region 114 that is sized and configured to contact at least a portion of back surface 13 of COB LED 10. Such a configuration may provide repeatable positioning of COB LED 10. Further, flange region 114 may be shaped generally congruent to back surface 13 of COB LED 10. Such a configuration may facilitate sealing of COB LED 10 to housing 110. In some embodiments, flange region 114 may be shaped to define a generally square opening, a generally circular opening, or any other desired opening shape, without limitation.

Further, substantially transparent material 166 may be positioned adjacent to COB LED 10. Substantially transparent material 166 may comprise a substantially transparent silicone, a substantially transparent epoxy, a substantially transparent adhesive, a substantially transparent epoxy resin, a substantially transparent polymer, a substantially transparent resin, and/or any other suitable material. A thickness "t" of substantially transparent material 166 between COB LED 10 and lens element 130 may be greater than 0.05 inches, between 0.05 inches and 0.1 inches, between 0.1 inches and 0.25, between 0.25 inches and 0.5 inches, or greater than 0.5 inches. Optionally, substantially transparent material 166 may be resistant to ultra-violet degradation (e.g., yellowing caused by exposure to sunlight). One example of a commercially available substantially transparent epoxy resin is marketed as "crystal resin" from PEBEO (located in GEMENOS Cedex—France). As may be appreciated, substantially transparent material 166 may also serve as a sealant material to prevent or inhibit liquid and/or gas from contacting COB LED 10. Optionally, in some embodiments, lens element 130 may be omitted and substantially transparent material 166 may allow light to pass outward from the COB LED 10. Optionally, retaining element 140 may be positioned adjacent to (e.g., at least partially contacting) COB LED 10, to retain COB LED 10 within housing 110. Alternatively, retaining element 140 may also be positioned adjacent to (or partially within) substantially transparent material 166 (and optionally sealant element 162) or may be omitted.

Further, similar to the description above with respect to FIG. 1, sealant element 162 may provide a liquid-tight and/or gas-tight seal between housing 110, retaining element 140, lens element 130, and/or substantially transparent material 166. More particularly, in some embodiments, sealant element 162 may comprise a sealant material, such as, for example, epoxy, silicone, resin, or rubber. For example, sealant element 162 may comprise 3M™ Marine Adhesive Sealant 5200 (fast cure or standard cure). In other embodiments, sealant element 162 may comprise an a-ring, a washer, a wiper seal, or any other suitable sealing element. In some embodiments, retaining element 140 may be configured to compress sealant element 162 and/or lens element 130. For example, retaining element 140 may include a threaded exterior surface configured to threadedly engage a complementary threaded interior surface of housing 110. Accordingly, such a retaining element 140 may be rotated to compress sealant element 162 against housing 110 and/or lens element 130. In other embodiments, retaining element 140 maybe rotated to compress lens element 130 and sealant element 162 may be positioned between lens element 130 and reflector element 132. Optionally, multiple sealant elements 162 may be configured and positioned to create a liquid-tight and/or gas-tight seal between two or more of substantially transparent material 166, housing 110, retaining element 140, and COB LED 10, without limitation. In some embodiments, one or both of sealant element 162 and substantially transparent material 166 may be compressible, which may allow for thermal expansion and/or contraction of COB LED 10, housing 110, and/or other components of a lighting assembly 100, while maintaining a liquid-tight and/or gas-tight seal relative to COB LED 10.

In one embodiment, a thermal cutoff 97, as illustrated, for example, in FIG. 4, may be used in any of the disclosed lighting assemblies and systems disclosed herein. As used herein, a "thermal cutoff" is an electrical safety device or circuit that interrupts or reduces electric current/power to a device when a temperature is detected (either by the thermal cutoff directly or by a sensor if the temperature is measured remotely) that exceeds a selected temperature. Such thermal cutoff devices may be configured for one-time use or may be configured for multiple uses (e.g., reset manually or automatically). The present invention contemplates that one or more thermal cutoffs 97 may be positioned proximate to or in at least partial contact with COB LED 10 and may be configured to interrupt or reduce the electric current/power delivered to COB LED 10. For example, one or more thermal cutoffs 97 may be positioned near a light-emitting area of COB LED 10, near a back surface of a substrate of COB LED 10, or in contact with a substrate of COB LED 10. In one embodiment, one or more thermal cutoffs 97 and at least a portion of COB LED 10 may be encapsulated by a substantially transparent material (e.g., by epoxy, silicone, resin, etc.) such that at least a portion of the back surface of the substrate of COB LED 10 is exposed (as described hereinabove).

In one embodiment, thermal cutoff 97 may be a thermal fuse, which comprises an electrical connection that may be melted or otherwise become electrically disconnected upon a selected temperature condition. For example, a small metal pellet may affix a flexed or displaced spring. If the pellet melts, the spring is released, thereby breaking the circuit. In another embodiment, thermal cutoff 97 may be a thermal switch, which electrically opens at a selected temperature (e.g., at a selected, relatively "high" temperature) and closes at temperatures less than about the selected temperature. For example, a thermal switch may comprise a bimetallic element (e.g., a bimetallic strip, a bimetallic dome-shaped cap, or a bimetallic washer, etc.) which deforms when heated above a certain temperature to break the electrical circuit. Another type of thermal switch is a positive temperature coefficient thermistor ("PTC" thermistor), which exhibits a dramatic increase in resistance as temperature rises, thereby reducing the current through the circuit. Other electrical circuits/devices may be incorporated to accomplish interruption and/or reduction of the electrical current/power to a COB LED. For example, one or more relays, one or more thermocouples, one or more microprocessors, one or more inductors, one or more capacitors, and/or one or more resistors may be included in thermal cutoff 97. In one embodiment, thermal cutoff 97 may comprise an electrical circuit designed to adjust the power delivered to a COB LED (e.g., by adjusting pulse width modulation of the electrical signal delivered to the COB LED). Any suitable thermal cutoff may be utilized, without limitation.

Figure 5A:
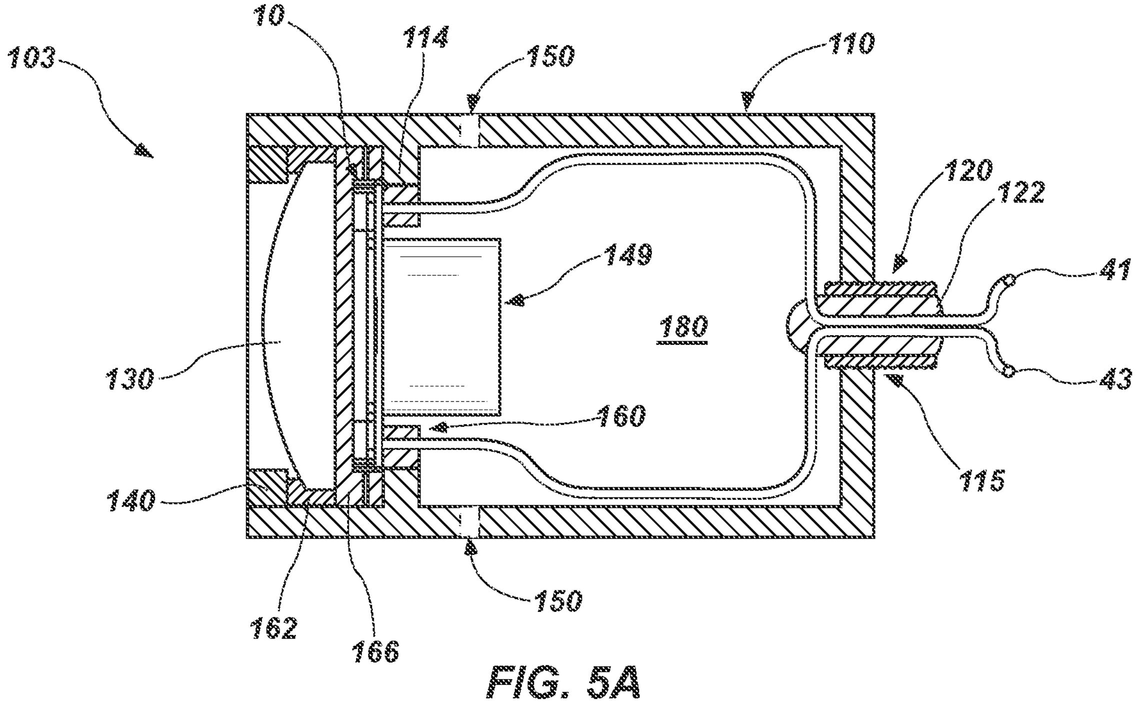
FIG. 5A shows a cross-sectional view of a further embodiment of a lighting assembly according to the present invention.

FIG. 5A shows a partial cross-sectional view of yet another embodiment of a lighting assembly 103 according to the present invention. More particularly, lighting assembly 103, as illustrated in FIG. 5A, is identical to lighting assembly 101 (illustrated in FIG. 4), except heat sink 149 is in thermal communication with COB LED 10. Heat sink 149 may comprise a material with a relatively high thermal conductivity, such as, for example, aluminum, copper, silver, gold, graphite, and/or any other suitable material. In addition, heat sink 149 may comprise a plurality of fins, protrusions, recesses, or other features designed to increase the surface area of heat sink 149. Such a configuration may cause increased heat transfer through heat sink 149. Heat sink 149 may be thermally connected to a majority of the exposed portion (i.e., the portion not covered by sealant element 160) of back surface 13 of COB LED 10 or may cover substantially the entire exposed portion of back surface 13. Thus, in some embodiments, a liquid and/or gas may contact an exposed portion of back surface 13 which is not covered by heat sink 149.

Heat sink 149 may be thermally connected to (e.g., at least partially contacting) COB LED 10. For example, heat sink 149 may be attached to COB LED 10 by fasteners (e.g., screws, bolts, rivets, etc.) through one or more of mounting holes 12 in COB LED 10. In another embodiment (not illustrated in FIG. 5A), a portion of heat sink 149 (e.g., such as an extending plate portion of heat sink 149 which is at least about the size of substrate 30) may be positioned between flange region 114 and COB LED 10, where COB LED is compressed or held against heat sink 149 (e.g., indirectly through retaining element 140 and/or lens element 130). Any such configurations including heat sink 149 may provide enhanced heat transfer from the substrate 30 of COB LED 10. Optionally, thermally conductive grease, thermally conductive silicone, or another thermally conductive compound may be positioned between heat sink 149 and COB LED 10 to enhance heat transfer therebetween.

Figure 5B:
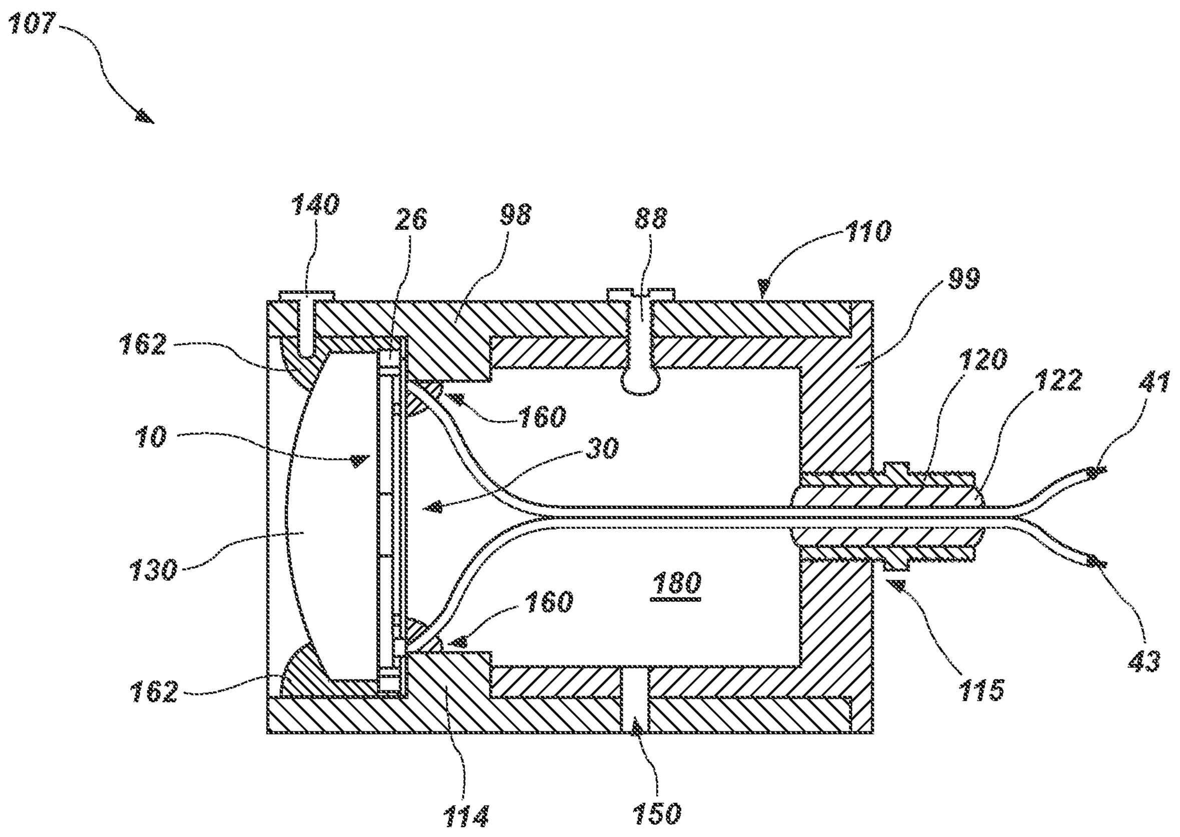
FIG. 5B shows a cross-sectional view of yet another embodiment of a lighting assembly according to the present invention.

FIG. 5B shows a partial cross-sectional view of yet another embodiment of a lighting assembly 107 according to the present invention. More particularly, the components and features (e.g., with the same reference numerals) of lighting assembly 107, as illustrated in FIG. 5B, may be similar or identical to those components and features of lighting assembly 101 (illustrated in FIG. 4). However, the present invention contemplates that a housing may comprise a plurality of separate bodies, parts, or pieces. As shown in FIG. 5B, housing 110 may comprise main body 98 and insert body 99. Main body 98 and insert body 99 may be attached to one another in any suitable manner. For example, main body 98 and insert body 99 may be adhesively bonded (e.g., glued), welded, and/or attached to one another via one or more fastener.

In one embodiment, as shown in FIG. 5B, main body 98 and insert body 99 may be attached to one another via at least one fastening element 88. For example, one fastening element 88, two fastening elements 88, three fastening elements 88, or more than three fastening elements 88 may be positioned around the periphery (e.g., equally spaced around the periphery) of housing 110. In one example, six holes may be formed through main body 98 and insert body 99, spaced equally around the periphery of housing 110, where a fastening element is positioned in every other hole (i.e., three holes) and the other three holes form three ports 150. Fastening element 88 may comprise a pin, a threaded fastener, a rivet, or any other suitable fastener. Such fastening element 88 may comprise a polymer (e.g., a plastic), a metal, and/or any other material. In one embodiment, fastening element 88 may comprise aluminum, carbon steel, stainless steel, any metal, or metal alloy.

Main body 98 and insert body 99 may respectively comprise a polymer, a metal, a metal alloy, or any suitable material. For example, main body 98 and insert body 99 may comprise a polymer (e.g., polyvinyl chloride (PVC)), any metal or metal alloy, brass, stainless steel, aluminum, and/or any other suitable material. In one embodiment, main body 98 may comprise a PVC pipe coupling and insert body 99 may comprise a PVC reducer bushing having a threaded opening 115. Generally, the material(s) from which each of main body 98 and insert body 99 is made may be selected to be resistant to corrosion (e.g., resistant to salt water or fresh water corrosion) and/or resistant to damage from exposure to sunlight.

As shown in FIG. 5B, COB LED 10 may be positioned within housing 110. Optionally, a portion of substrate 30 and/or template 26 may be removed (e.g., by machining, milling, grinding, sawing, cutting, etc.) from COB LED 10 (e.g., as described above relative to FIG. 1C) so that COB LED 10 fits within housing 110. In one embodiment, corner portions of a generally square COB LED 10 may be removed such that COB LED 10 fits within a generally cylindrical portion of main body 98. Further, as shown in FIG. 5B, lens element 130 may be positioned directly upon COB LED 10 (e.g., without any substantially transparent material) and sealant element 162 may be positioned between at least two of lens element 130, main body 98, and COB LED 10. In addition, at least one retaining element 140 may be positioned adjacent to lens element 130 or contacting lens element 130. A retaining element 140 may comprise a fastening element. For example, a retaining element 140 may comprise any of the features or embodiments described with respect to fastening element 88. As shown in FIG. 5B, each retaining element 140 may comprise a rivet extending through a hole formed in main body 98. For example, one retaining element 140, two retaining elements 140, three retaining elements 140, or more than three retaining elements 140 may be positioned around the periphery (e.g., equally spaced around the periphery) of main body 98. In one example, three holes may be formed through main body 98, spaced equally around the periphery main body 98 (or around the periphery of lens element 130), where one retaining element 140 is positioned in each hole.

Furthermore, still referring to FIG. 5B, sealant element 162 may be as described herein. Further, sealant element 162 may provide a liquid-tight and/or gas-tight seal between at least two of main body 98, lens element 130, and COB LED 10. Also, sealant element 160 may comprise any configuration or material described herein with respect to sealant element 160. Thus, sealant element 160 may be configured to seal between COB LED 10 and housing 110 (e.g., between a back surface 13 of substrate 30 and main body 98). Further, sealant element 160 (or another sealant element) may seal electrical conductors 41 and 43 (e.g., between electrical conductors 41 and 43 and housing 110 and/or COB LED 10).

Figure 6:
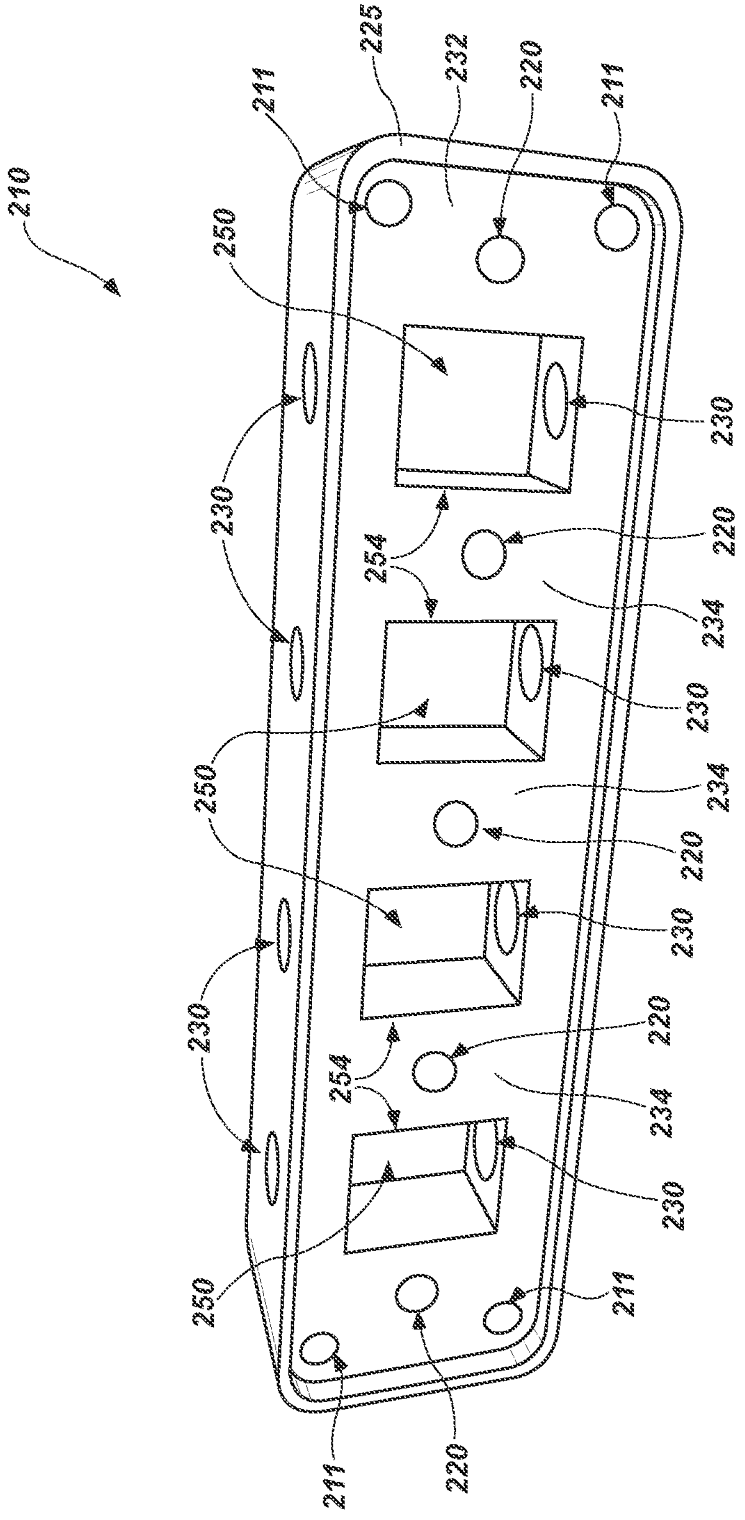
FIG. 6 shows a generally front-facing perspective view of a housing according to the present invention.

While the foregoing description and figures relate to embodiments of a lighting assembly including a single light-emitting device (e.g., at least one COB LED), the present invention is not so limited. Generally, the embodiments contemplated herein include at least one light-emitting device (e.g., at least one COB LED). In some embodiments, a plurality of light-emitting devices (e.g., a plurality of COB LEDs) may be included in a lighting assembly. FIG. 6 shows a generally front-facing perspective view of one embodiment of a housing 210, which is designed to accommodate four COB LEDs 10 (not shown in FIG. 6). In further detail, housing 210 includes mounting holes 211, front surface 232, ports 230, interior chambers 250, and electrical passageways 220 formed through support features 234. In addition, front surface 232 and the front surface of support features 234 may be substantially coplanar. Retaining edge feature 225 may extend around the periphery of the front of housing 210 to provide a retaining lip feature as will be discussed in greater detail below. As shown in FIG. 6, housing 210 may comprise openings 254 corresponding to interior chambers 250, respectively. Such a configuration may provide repeatable positioning of a COB LED 10 (not shown) adjacent to each opening 254. Further, each opening 254 may be shaped to be generally congruent to back surface 13 of a COB LED 10. As described below, such a configuration may facilitate sealing of COB LED 10 (not shown) to housing 210. In some embodiments, opening 254 may be shaped to define a generally square opening, a generally circular opening, or any other desired opening shape, without limitation.

Figure 7:
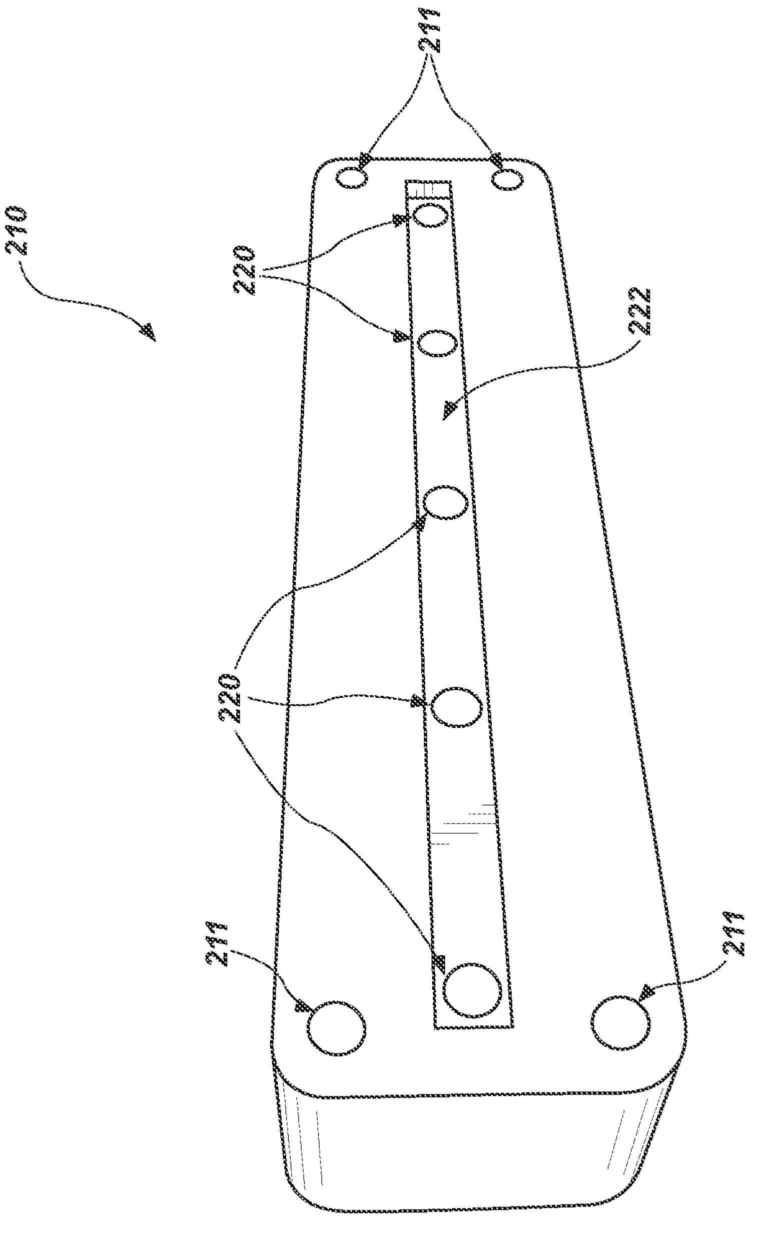
FIG. 7 shows a generally back-facing perspective view of the housing shown in FIG. 6.

Turning to FIG. 7, FIG. 7 shows a generally back-facing perspective view of housing 210. As shown in FIG. 7, mounting holes 211 extend entirely through housing 210. Further, electrical passageways 220 extend from a front face of support features 234 (FIG. 6) to a wiring channel 222. As shown in FIG. 7, in one embodiment, housing 210 may be generally cubic. In other embodiments, housing 210 may be partially cylindrical, spheroid, frusto-conical, or any selected shape. Housing 210 may comprise a polymer, a metal, a metal alloy, or any suitable material. For example, housing 210 may comprise polyvinyl chloride (PVC), brass, steel (e.g., stainless steel), aluminum, or any other suitable material. The material(s) from which housing 210 is made may be selected to be resistant to corrosion (e.g., resistant to salt water or fresh water corrosion) and/or resistant to damage from exposure to sunlight.

Figure 8:
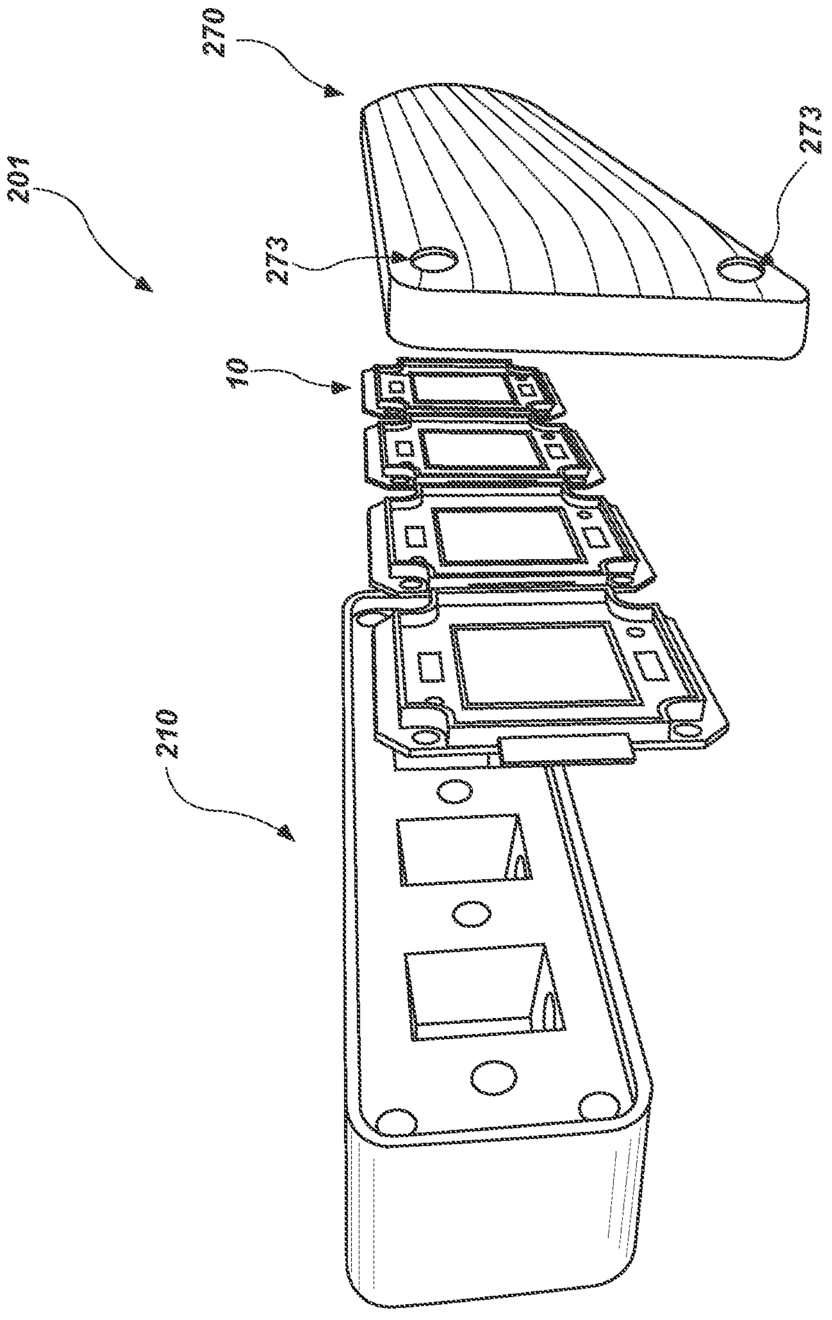
FIG. 8 shows an exploded perspective view of a lighting assembly including a plurality of light-emitting devices according to the present invention.

FIG. 8 shows an exploded assembly view of four COB LEDs 10, housing 210, and lens element 270. Lens element 270 may be positioned adjacent to COB LEDs 10. Lens element 270 may be substantially transparent. Accordingly, lens element 270 may comprise glass, a substantially transparent material, a substantially transparent plastic or polymer, or any other suitable material. Optionally, lens element 270 may include mounting holes 273, which may correspond with mounting holes 211 of housing 210. In other embodiments, lens element 270 may be adhesively (e.g., via at least one sealant element) attached to housing 210 and/or may be positioned by and/or attached to housing 210 by one or more retention elements (not shown; e.g., as described with respect to FIGS. 4 and 5). Thus, during operation, light-emitting area 25 may emit light, where such light may pass through lens element 270. As may be appreciated, lens element 270 may be designed and/or configured to direct, focus, and/or diffuse light in a certain direction, pattern, and/or shape. Optionally, as described above in relation to FIG. 2, a reflector element (not shown) may be positioned adjacent to one or more of COB LEDs 10 (as shown in FIGS. 9-15) such that a reflective opening of the reflector element is positioned about one or more light-emitting area 25. Such a reflector element may comprise a plastic and may be coated with a reflective coating (e.g., a chrome coating).

Figure 9:
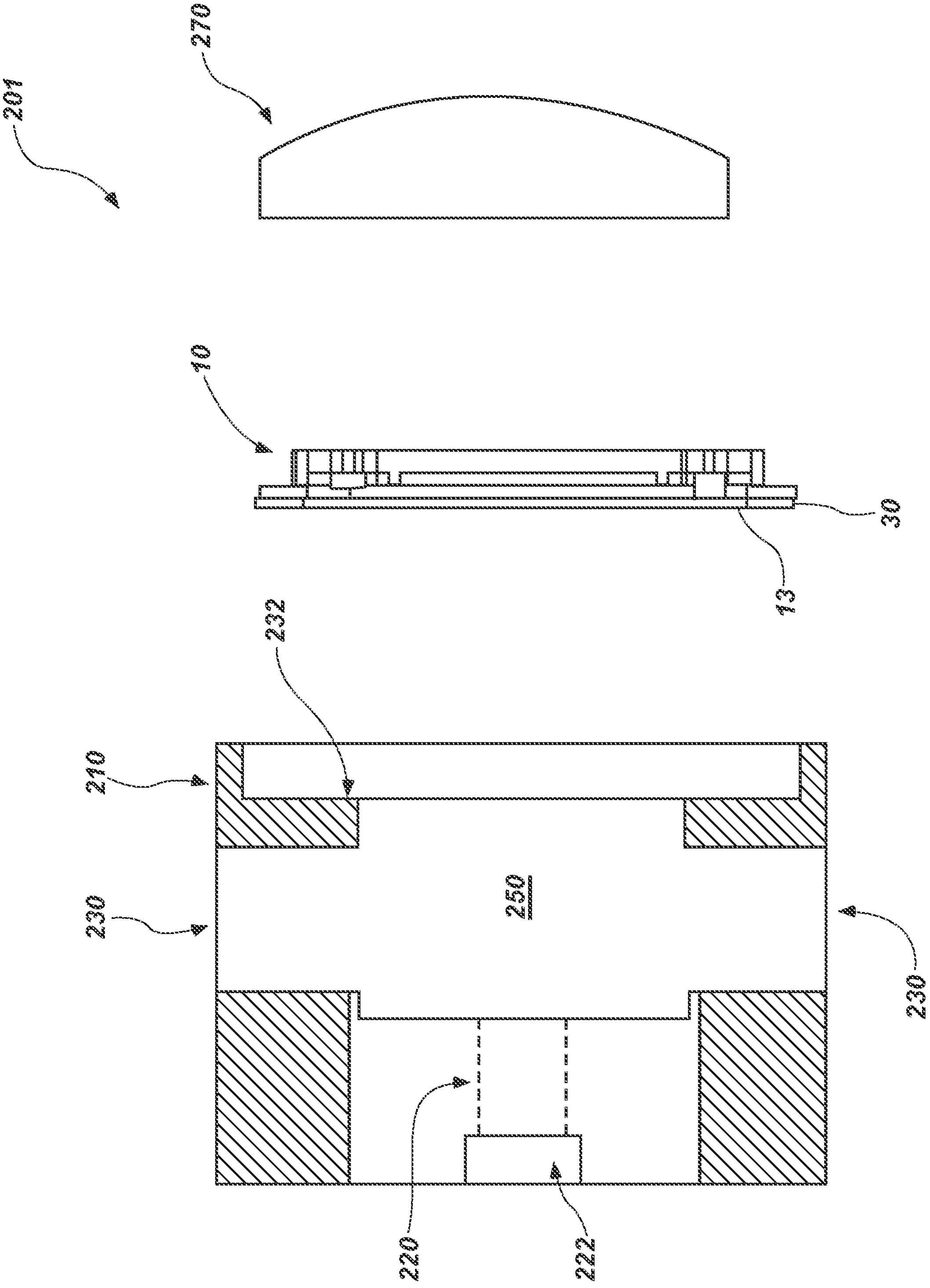
FIG. 9 shows a cross-sectional, exploded view of the lighting assembly including a plurality of light-emitting devices shown in FIG. 8.
Figure 11:
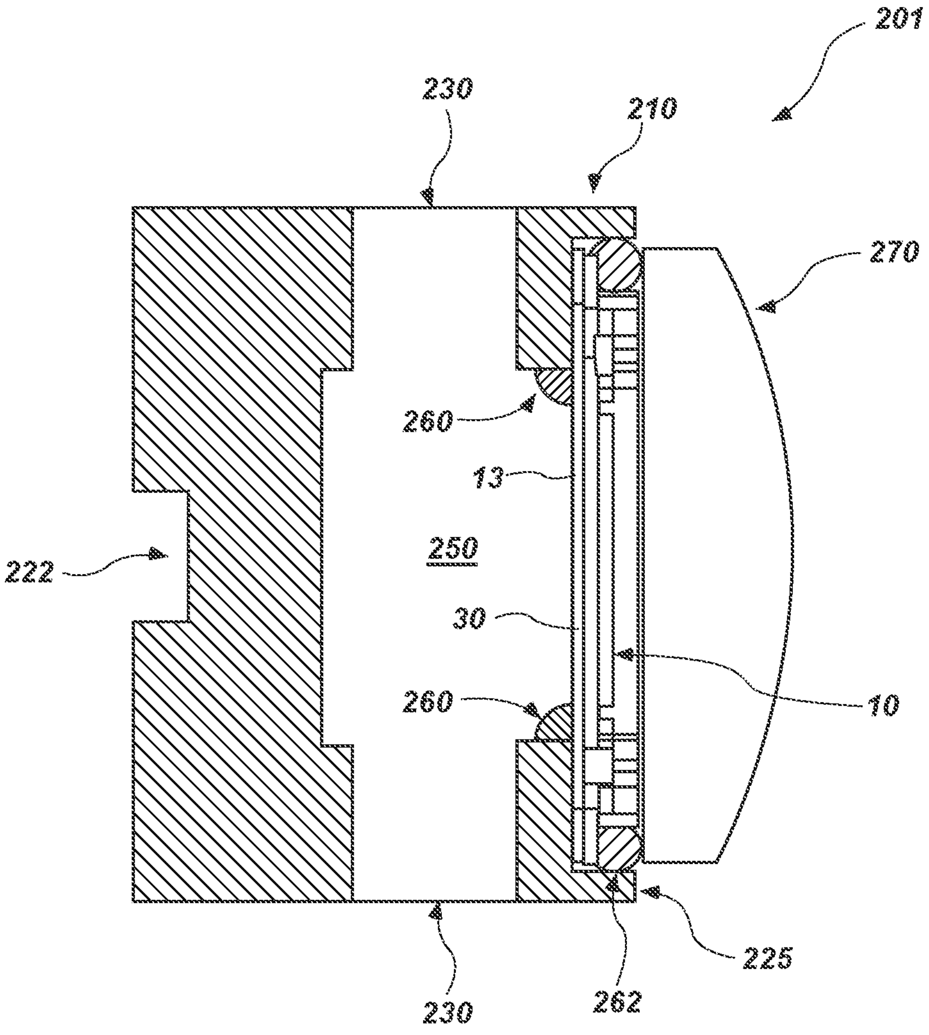
FIG. 11 shows a cross-sectional view of one embodiment of the lighting assembly shown in FIG. 8.
Figure 12:
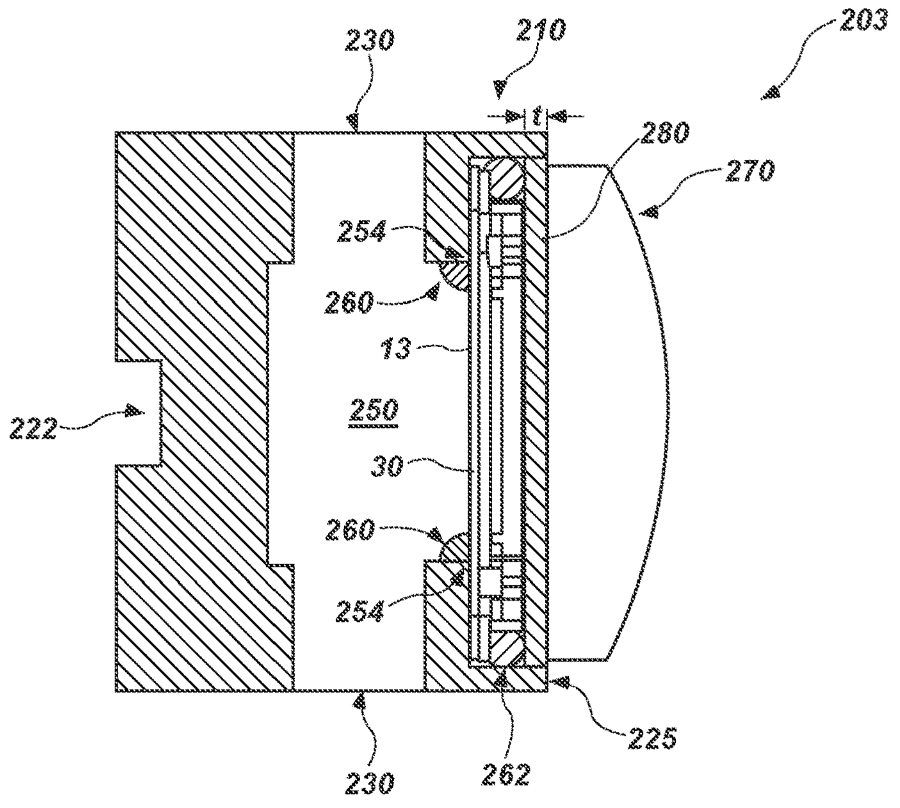
FIG. 12 shows a cross-sectional view of another embodiment of a lighting assembly according to the present invention.
Figure 13:
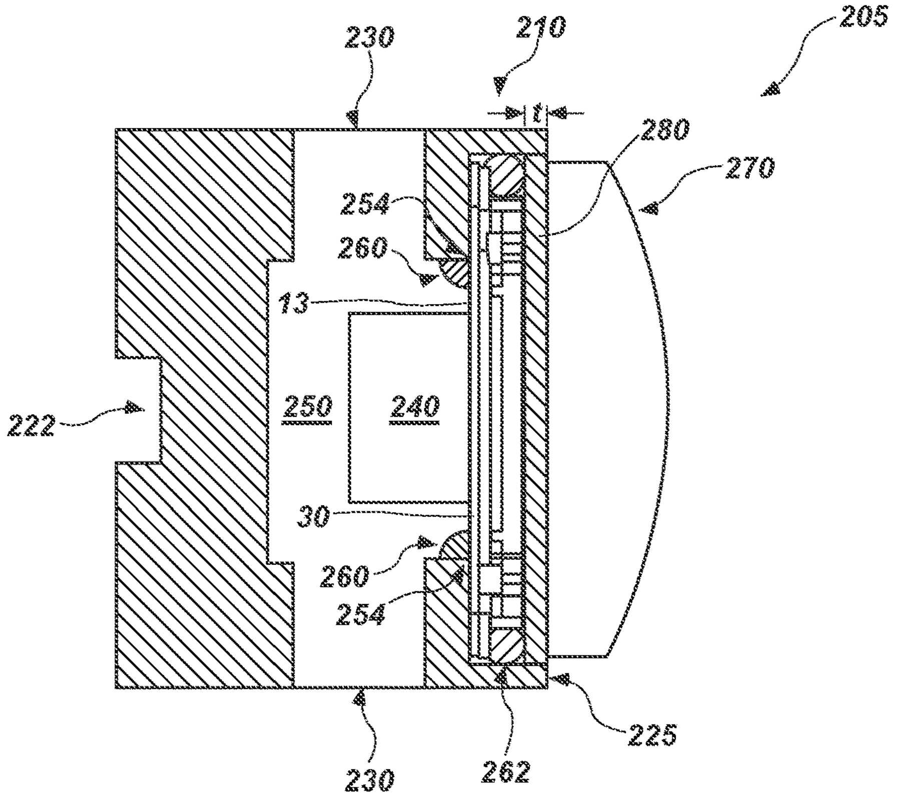
FIG. 13 shows a cross-sectional view of a further embodiment of a lighting assembly according to the present invention.

FIG. 9 shows an exploded cross-sectional view of housing 210 and one COB LED 10, while FIGS. 11, 12, and 13 each show a cross-sectional view of housing 210 and one COB LED 10, where back surface 13 of COB LED 10 is positioned adjacent to or contacting front surface 232 of housing 210. As described above, the present invention contemplates that each COB LED 10 may be cooled by a liquid and/or a gas. Generally, at least one port may be formed in housing 210 to allow a liquid and/or gas in which lighting assembly is exposed (e.g., at least partially submerged) to pass through. As shown in FIGS. 9, 11, 12, and 13, ports 230 may be configured to allow liquid and/or gas to pass into an interior chamber 250 of housing 210. Such liquid and/or gas may contact at least a portion of back surface 13 of COB LED 10 to provide cooling during operation of COB LED 10. At least one port 230 may be sized and configured in any desired manner. For example, it may be desirable to have one port 230 that is larger than another port 230. In one embodiment, a larger port (not illustrated) may be positioned above (with respect to the direction of gravity) a smaller port (not illustrated). Such a configuration may retain liquid and/or gas in chamber 250 for a desired amount of time.

Although FIGS. 9, 11, 12, and 13 show an individual chamber 250 for each of COB LEDs 10, in other embodiments, a larger, common chamber or plenum may be sized to accommodate a plurality of COB LEDs (e.g., wherein a plurality of substrates are exposed to a common chamber). Further, in some embodiments, at least one port 230 may be sized to inhibit marine organisms from entering interior chamber 250. In another embodiment, at least one port 230 may be sized to allow cleaning (e.g., via a brush or other cleaning implement) of interior chamber 250, substrate 30 of COB LED 10, or any other component positioned within interior chamber 250. Optionally, screens or filters may be positioned across or within at least one port 230 to filter or screen liquid or gas entering interior chamber 250.

Figure 10A:
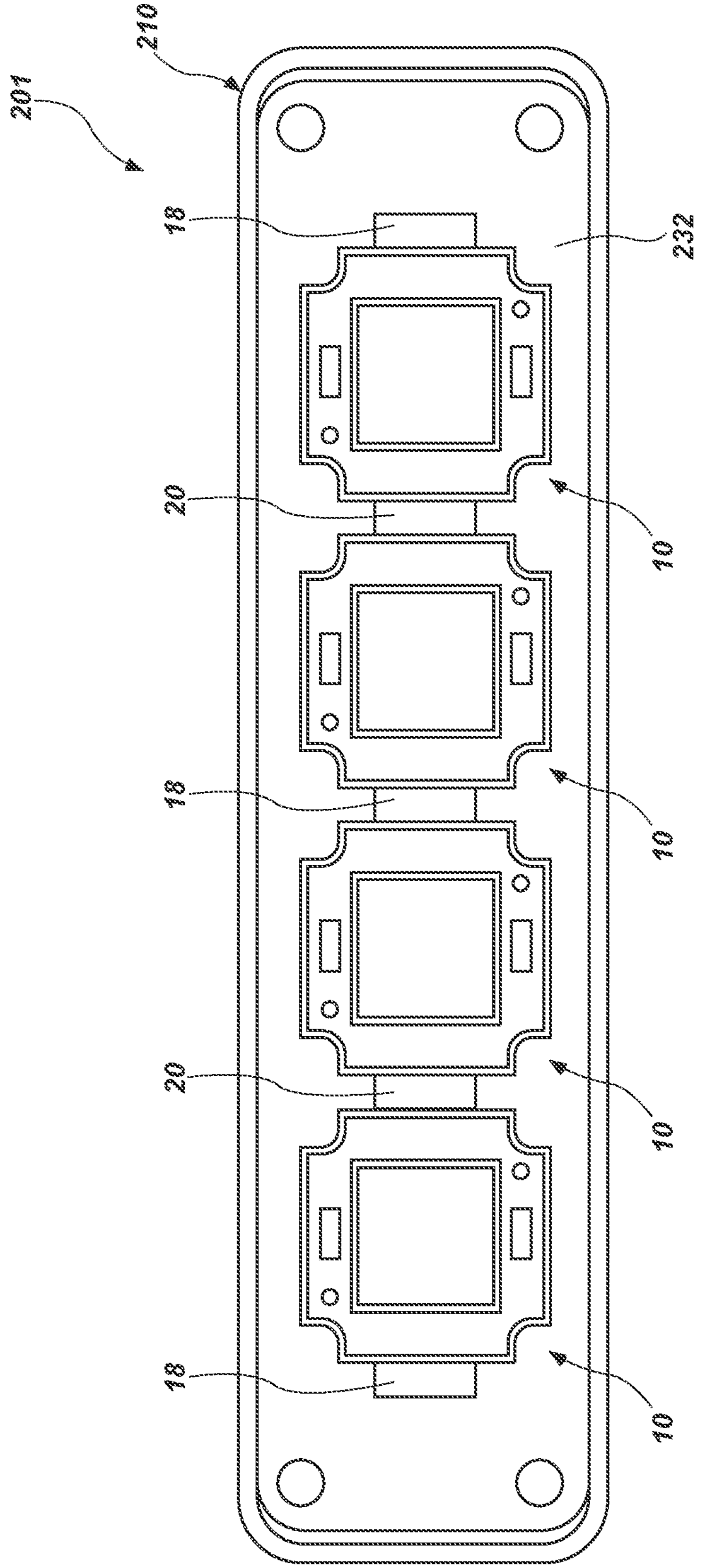
FIG. 10A shows a front view of the lighting assembly shown in FIG. 8 (lens element is not shown), however, the plurality of light-emitting devices are assembled with the housing.

In further detail, FIG. 10A shows a front view of four COB LEDs 10 positioned adjacent to front surface 232 of housing 210. As shown in FIG. 10A, COB LED 10 may be positioned within housing 210. Optionally, a portion of substrate 30 and/or template 26 may be removed from COB LED 10 so that COB LED 10 fits within housing 210. In one embodiment, COB LED 10 may be attached to housing 210 by fasteners (e.g., screws, bolts, rivets, etc.) through one or more of mounting holes 12 in COB LED 10 (see, e.g., mounting holes 12 illustrated in FIG. 1A). FIG. 10A further shows that electrical tabs 18 and 20 of each COB LED 10 may be positioned such that, between adjacent COB LEDs 10, each electrical tab 18 or 20 of a first COB LED 10 overlaps with the same electrical tab 18 or 20 of the second COB LED 10, respectively. In addition, electrical tabs 18 or 20 of each COB LED 10 are each positioned adjacent to a respective electrical passageway 220.

Figure 10B:
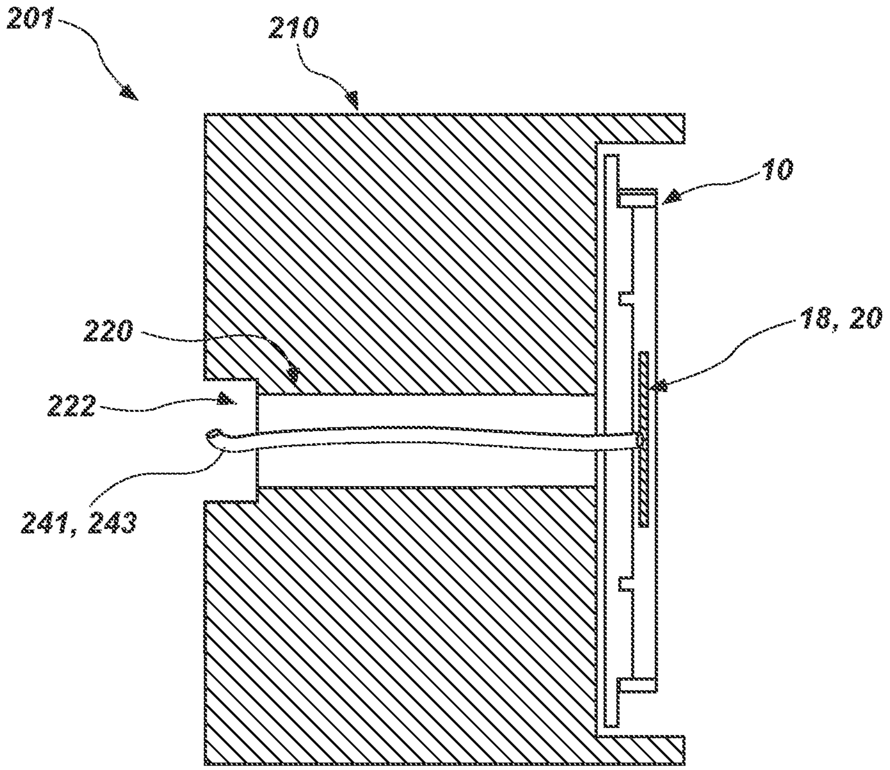
FIG. 10B shows a partial cross-sectional view, taken through an electrical passageway, of one embodiment of the lighting assembly shown in FIG. 10A.

In further detail, FIG. 10B shows a partial cross-sectional view (lens element omitted) of lighting assembly 201, taken through one electrical passageway 220. Particularly, electrical conductors 241 or 243 may pass through housing 210 via electrical passageway 220 to make electrical connections with one or two of electrical tabs 18 or one or two of electrical tabs 20 of COB LED 10, as described above. Electrical conductors 241 and 243 may comprise any suitable electrically conducting structure, such as, for example, insulated wire, wire, metal, a metal alloy, or any other suitable conducting structure. Accordingly, as shown in FIGS. 6, 10A, 10B, and 10C, the three electrical passageways 220 that are formed through support features 234 may provide a passageway for an electrical conductor (e.g., electrical conductor 241 or electrical conductor 243) for two electrical tabs of the same electrical polarity (e.g., 18 or 20) of adjacent COB LEDs 10, while the other, outer two electrical passageways 220 may provide a passageway for an electrical conductor for one electrical tab (e.g, 20 or 18) of a respective COB LED 10.

Figure 10C:
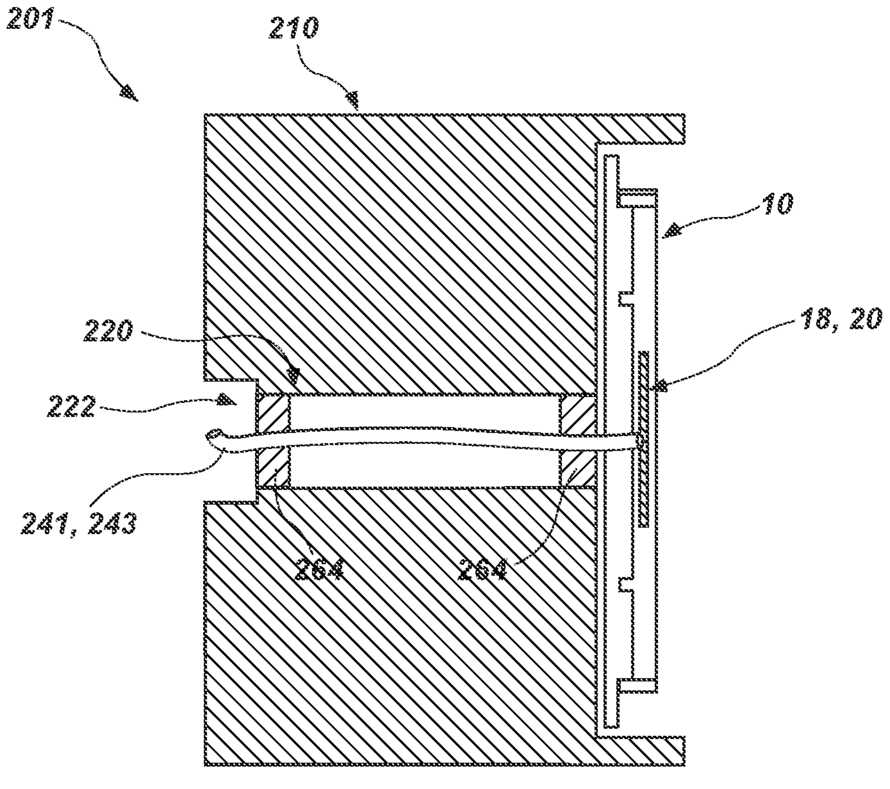
FIG. 10C shows a partial cross-sectional view, taken through an electrical passageway, of another embodiment of the lighting assembly shown in FIG. 10A.

Thus, for example, where electrical tabs 18 represent negative or grounding electrical connectors, the outer two electrical passageways 220 and the center electrical passageway 220 may each contain an electrical conductor (e.g., as shown in FIG. 10B or FIG. 10C) that may be connected to a negative or ground terminal of a power source (e.g., a battery, a step-up voltage converter, or any other power system or source). Optionally, such electrical conductors may be connected together (e.g., in wiring channel 22) and a single electrical connector may be connected to a negative or ground terminal of a power source. Furthermore, the remaining electrical passageways 220 formed through support features 234 may each contain an electrical conductor (e.g., as shown in FIGS. 10B and 10C) that may be connected to a positive terminal of the power source. Optionally, such electrical conductors may be connected together (e.g., in wiring channel 22) and then a single electrical connector may be connected to a positive terminal of a power source. Such a configuration may provide a relatively efficient design for providing electrical connections to COB LEDs 10. The present invention also contemplates that, in embodiments where housing 210 comprises an electrically conductive material (e.g., a metal or metal alloy), the negative or grounding electrical tabs (e.g., electrical tabs 18 or electrical tabs 20) of COB LEDs 10 may be electrically connected to the housing 210 (e.g., by soldering, riveting, by fasteners, and/or by any other suitable structure) and those respective electrical passageways 220 that would have otherwise provided a passageway for an electrical connector to such electrical tabs (e.g., electrical tabs 18 or electrical tabs 20) may be omitted.

In another embodiment, FIG. 10C shows a partial cross-sectional view (lens element omitted) of lighting assembly 201, taken through one electrical passageway 220. As described above with respect to FIG. 10B, electrical conductors 241 or 243 may pass through housing 210 via electrical passageway 220 to make electrical connections with one or two of electrical tabs 18 or one or two of electrical tabs 20 of COB LED 10. In addition, sealant elements 264 may also seal electrical conductors 241 and/or 243 (e.g., between electrical conductors 241 and 243, housing 210, electrical passageway 220, and/or COB LED 10). In some embodiments, a sealant element 264 may be formed and/or positioned adjacent to one or more electrical tab (e.g., one or more electrical tab 18 or one or more electrical tab 20). In some embodiments, a sealant element 264 may be formed and/or positioned adjacent to wiring channel 222. More generally, one or more sealant elements 264 may be formed and/or positioned anywhere within an electrical passageway 220 and/or wiring channel 222. In other embodiments, electrical conductors 241 and 243 may be at least partially embedded within housing 210 to at least partially protect or seal the electrical conductors 241 and 243.

As shown in FIG. 11, a sealant element 260 may be positioned between back surface 13 of COB LED 10 and housing 210. For example, sealant element 260 may be positioned between back surface 13 of COB LED 10 and surfaces of interior chamber 250. Optionally, sealant element 260 may be positioned between back surface 13 of COB LED 10 and front surface 232 of housing 210. Sealant element 260 may comprise any configuration or material described above with respect to sealant element 162. Thus, sealant element 260 may be configured to seal between a back surface 13 of substrate 30 of COB LED 10 and housing 210. Thus, liquid and/or gas within each interior chamber 250 may contact only a portion of a back surface 13 of each of COB LEDs 10. In some embodiments, less than 95%, less than 90%, less than 85%, less than 80%, less than 70%, or less than 60% of back surface 13 of each of COB LEDs 10 may be exposed. Mother embodiments, one or more of COB LEDs 10 may be sealed peripherally (e.g., along a side surface, such as along a side surface of substrate 30) to housing 210 and the entire back surface 13 of such COB LED 10 may be exposed.

As further illustrated in FIG. 11, a sealant element 262 may provide a seal (e.g., against liquid and/or gas) between housing 210, COB LED 10, and/or lens element 270. In some embodiments, sealant element 262 may comprise a sealant material, such as, for example, epoxy, silicone, resin, or rubber. Sealant element 262 may comprise any configuration or material described above with respect to sealant element 162 illustrated in FIGS. 3-5B. For example, sealant element 262 may comprise 3M™ Marine Adhesive Sealant 5200 (fast cure or standard cure). In other embodiments, sealant element 262 may comprise an a-ring, a washer, a wiper seal, or any other suitable sealing element. In some embodiments, fasteners may be configured to compress sealant element 262 and/or lens element 270. For example, fasteners (not shown) may pass through mounting holes (e.g., mounting holes 273 as shown in FIG. 8) in lens element 270 and also through mounting holes 211 in housing 210. Accordingly, such fasteners may compress sealant element 262. Optionally, multiple sealant elements 262 (e.g., one a-ring surrounding COB LEDs 10 between housing 210 and lens element 270 and 3M™ Marine Adhesive Sealant 5200 between lens element 270 and retaining edge feature 225) may be configured and positioned to create a liquid and/or gas seal between two or more of housing 210, lens element 270, and COB LED 10, without limitation.

FIG. 12 shows a cross-sectional view of another embodiment of a lighting assembly 201 taken through housing 210 and one COB LED 10. As shown in FIG. 12, COB LED 10 may be positioned within housing 210, adjacent to opening 254 of interior chamber 250. Such a configuration may provide repeatable positioning of COB LED 10. Further, opening 254 may be shaped to be generally congruent to back surface 13 of COB LED 10. Such a configuration may facilitate sealing of COB LED 10 to housing 210. In some embodiments, opening 254 may be shaped to define a generally square opening, a generally circular opening, or any other desired opening shape, without limitation. Further, substantially transparent material 280 may be positioned adjacent to COB LED 10. Substantially transparent material 280 may comprise a substantially transparent silicone, a substantially transparent epoxy, a substantially transparent adhesive, a substantially transparent epoxy resin, a substantially transparent polymer, a substantially transparent resin, or any other suitable material. A thickness “t”, as shown on FIG. 12 of substantially transparent material 280 may be greater than 0.05 inches, between 0.05 inches and 0.1 inches, between 0.1 inches and 0.25, between 0.25 inches and 0.5 inches, or greater than 0.5 inches. Optionally, substantially transparent material 280 may be resistant to ultra-violet degradation (e.g., yellowing caused by exposure to sunlight). One example of a commercially available substantially transparent epoxy resin is marketed as “crystal resin” from PEBEO (located in GEMENOS Cedex—France). As may be appreciated, substantially transparent material 280 may also serve as a sealant material to prevent or inhibit liquid or gas from contacting COB LED 10. Optionally, in some embodiments, lens element 270 may be omitted and substantially transparent material 280 may allow light to pass outward from the COB LED 10.

FIG. 13 shows a cross-sectional view of yet another embodiment of a lighting assembly 205 according to the present invention. More particularly, lighting assembly 205, as illustrated in FIG. 13, is identical to lighting assembly 203 (illustrated in FIG. 12), except heat sink 240 is in thermal communication with COB LED 10. Heat sink 240 may comprise a material with a relatively high thermal conductivity, such as, for example, aluminum, copper, silver, gold, graphite, or any other suitable material. In addition, heat sink 240 may comprise a plurality of fins, protrusions, recesses, or other features designed to increase the surface area of heat sink 240. Such a configuration may cause increased heat transfer through heat sink 240. Heat sink 240 may be thermally connected to a majority of the exposed portion (i.e., the portion not covered by sealant element 260) of back surface 13 or may cover the entire exposed portion of back surface 13 or even the entire back surface 13. Thus, in some embodiments, a liquid and/or gas may contact an exposed portion of back surface 13 that is not covered by heat sink 240. Heat sink 240 may be thermally connected to (e.g., at least partially contacting) COB LED 10. For example, heat sink 240 may be attached to COB LED 10 by fasteners (e.g., screws, bolts, rivets, etc.) through one or more of mounting holes 12 in COB LED 10. In another embodiment (not illustrated in FIG. 13), a portion of heat sink 240 (e.g., such as an extending plate portion of heat sink 240 which is at least about the size of substrate 30) may be positioned between housing 210 and back surface 13 of COB LED 10, and COB LED 10 may be compressed or held against heat sink 240 (e.g., indirectly through lens element 270 or a suitable retaining element (not shown)). Any such configurations including heat sink 240 may provide enhanced heat transfer from the substrate 30 of COB LED 10. Optionally, thermally conductive grease, thermally conductive silicone, or another thermally conductive compound may be positioned between heat sink 240 and COB LED 10 to enhance heat transfer therebetween.

Figure 14:
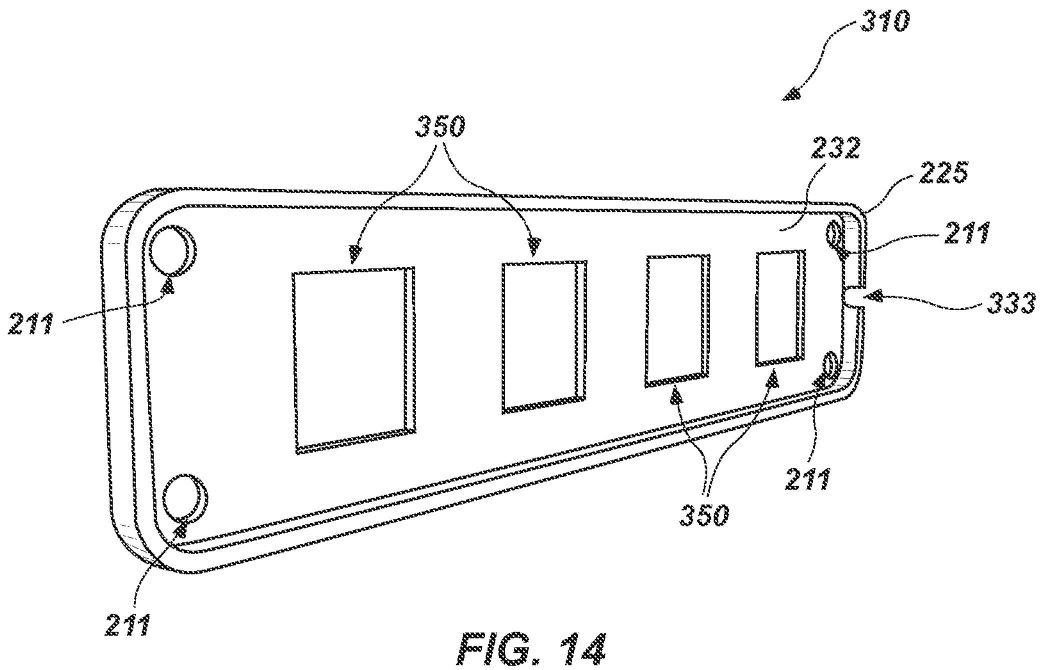
FIG. 14 shows a generally front-facing perspective view of another embodiment of a housing according to the present invention.

In yet another aspect of the present invention, a housing may accommodate a COB LED such that the substrate of the COB LED is exposed to the ambient environment, but the light-emitting area is sealed from the ambient environment. Particularly, FIG. 14 shows one embodiment of a housing 310, which includes some of the features described above with respect to housing 210. For example, housing 310 includes mounting holes 211, retaining edge feature 225, and front surface 232 as described above with respect to housing 210. However, housing 310 additionally includes a wiring recess 333, which is configured to allow for electrical conductors (not shown) to pass through. More particularly, electrical conductors (not shown) (e.g., generally extending between each COB LED 10 and between front face 232 and lens element 270) may connect solder pads 22 and 24 or electrical tabs 18 and 20 of each COB LED 10 to an electrical power source.

Figure 15:
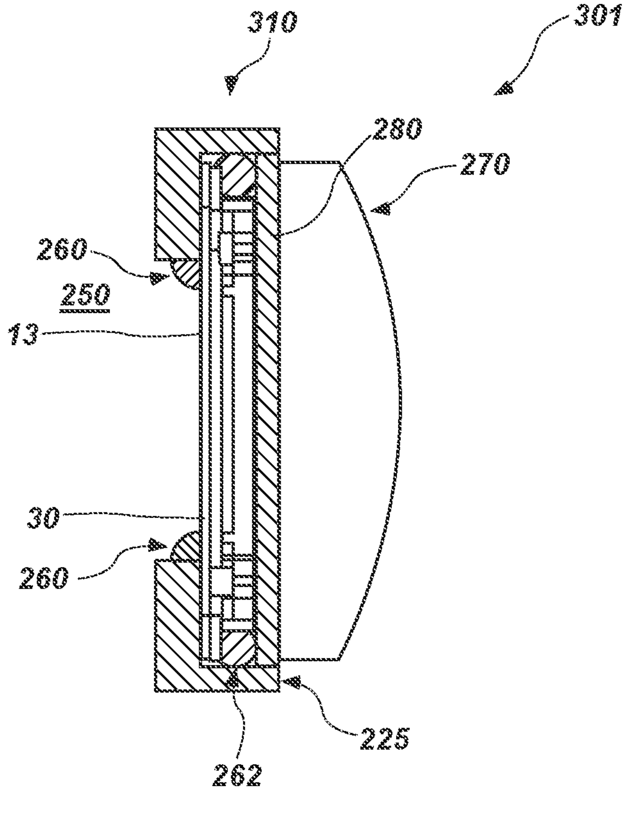
FIG. 15 shows a cross-sectional view of one embodiment of a lighting assembly including the housing shown in FIG. 14.

In such a configuration, wiring recess 333 may be sealed with any suitable sealant element as described herein. In addition, housing 310 includes openings 350. Similar to the lighting assembly 201 shown in FIG. 8, one COB LED (not shown) may be positioned adjacent to front surface 232 of housing 310 and generally centered with respect to an associated opening 350 (e.g., a centroid of the back surface of an COB LED may be generally centered with the centroid of opening 350). In further detail, FIG. 15 shows a cross-sectional view of another embodiment of a lighting assembly 301 taken through housing 310 and one COB LED 10. As shown in FIG. 15, COB LED 10 may be positioned within housing 210, adjacent to opening 350. Further, opening 350 may be shaped to be generally congruent to back surface 13 of COB LED 10 or may be as described herein with respect to opening 254, without limitation. Such a configuration may facilitate sealing of COB LED 10 to housing 310. In some embodiments, opening 350 may be shaped to define a generally square opening, a generally circular opening, or any other desired opening shape, without limitation. Otherwise, the labeled elements shown in FIG. 15 may be as described above with respect to FIG. 12.

The lighting assemblies disclosed herein (e.g., lighting assemblies 100, 101, 103, 201, 203, 205, and 301) may be used, for example, to illuminate a liquid environment such as a fountain, pool, aquarium, hot tub, or beach. Such illumination may be provided for decorative purposes, to illuminate a work area (e.g., such as for underwater welding), for safety purposes (e.g., such as to demarcate a shallow end and deep end of a pool), and/or for any other purpose. In other embodiments, the lighting assemblies disclosed herein may be used in an environment where exposure to rain, snow, water, or another liquid is intermittent. For example, the lighting assemblies disclosed herein may be used on automobiles, other vehicles, motorcycles, all-terrain vehicles, buildings, or for any other suitable use. Particularly, cooling the at least one light-emitting device (e.g., at least one COB LED) may extend the life of the lighting assembly and/or protect the lighting assembly from overheating.

One application for an underwater lighting unit is in underwater hull lighting systems for the hulls of yachts, boats and other marine craft. For example, at least one lighting assembly may be coupled to the hull of the marine craft, surface-mounted, or installed in a threaded hole (e.g., a drain hole). For a recessed mounting, a lighting unit as described herein may be mounted within a cofferdam that is recessed into the hull of a watercraft. No glass window would be provided across the cofferdam in front of the lighting unit, so that the water in which the craft is afloat enters the housing to achieve the cooling described above. The associated electrical wiring may pass through an aperture in the housing and into the inside of the hull. Optionally, a seal between the lighting unit and the rear wall of the cofferdam may prevent water from entering the hull. For example, a seal as described and claimed in British Patent Specification No. 2258035 may be used. The disclosure of British Patent Specification No. 2258035 is incorporated herein, in its entirety, by this reference. U.S. Pat. Nos. 7,396,139 and 8,016,463 disclose systems such as boats or other marine vehicles including lighting assemblies; any such systems may include one or more lighting assembly as disclosed herein. Furthermore, the disclosure of each of U.S. Pat. Nos. 7,396,139 and 8,016,463 is incorporated, in its entirety, by this reference.

As indicated above, one or more lighting assemblies may be attached to (e.g., surface-mounted below the waterline) or incorporated within a marine vehicle (e.g., attached or within a yacht, boat, personal watercraft, an underwater robot, an autonomous underwater vehicle, a remotely-operated vehicle, a diver propulsion vehicle, a submarine, or any other marine vehicle/system). Any lighting assembly attached to a marine vehicle may be streamlined in shape, to generate reduced water resistance and drag as the craft moves through the water. The housing and lens may have dimensions (e.g., where the housing contacts the hull) of typically 100 to 300 mm in length and 10 mm to 50 mm in depth. The shape of the housing and lens may exhibit a rounded outline from a generally flat back face that contacts the hull, and may have angled or rounded leading and trailing ends. One or more threaded fasteners for connecting the lighting assembly to the hull of the craft may be provided near each end of the housing. Optionally, one or more of the threaded fasteners (e.g., mounting bolts) may be hollow to create a hollow tubular externally screw-threaded mounting stem through which the electrical leads for powering the light-emitting device (e.g., a COB LED) pass. Threaded fasteners may be threaded into the yacht, boat or other marine craft and a sealant (e.g., epoxy, silicone, resin, rubber, 3M™ Marine Adhesive Sealant 5200, an a-ring, a washer, a wiper seal, or any other suitable sealing element) may be positioned between housing and the yacht, boat or other marine vehicle to prevent water from entering the interior of the hull.

Figure 16:
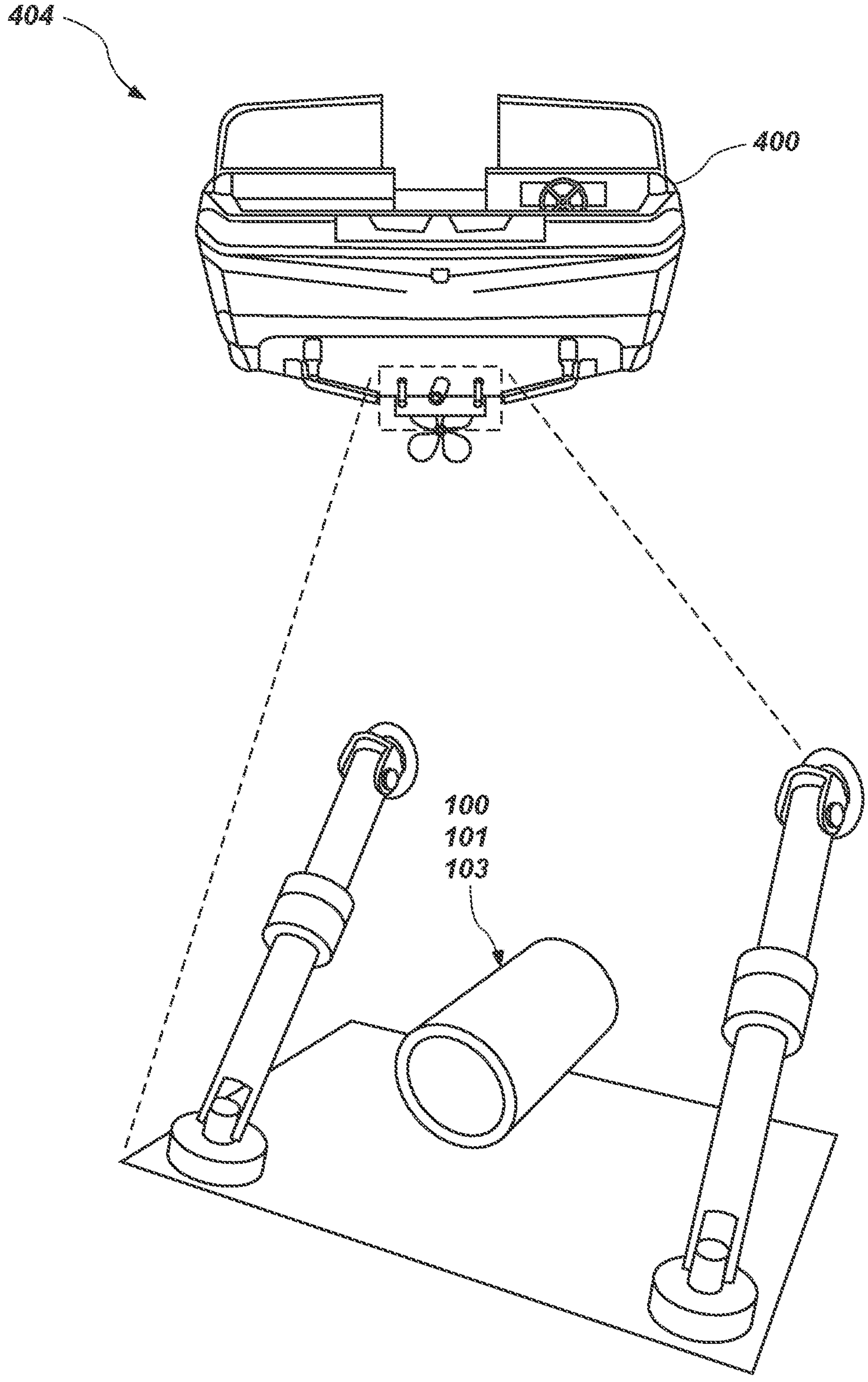
FIG. 16 shows a back view and an enlarged partial view of a marine system comprising a boat including a lighting assembly according to the present invention.
Figure 17:
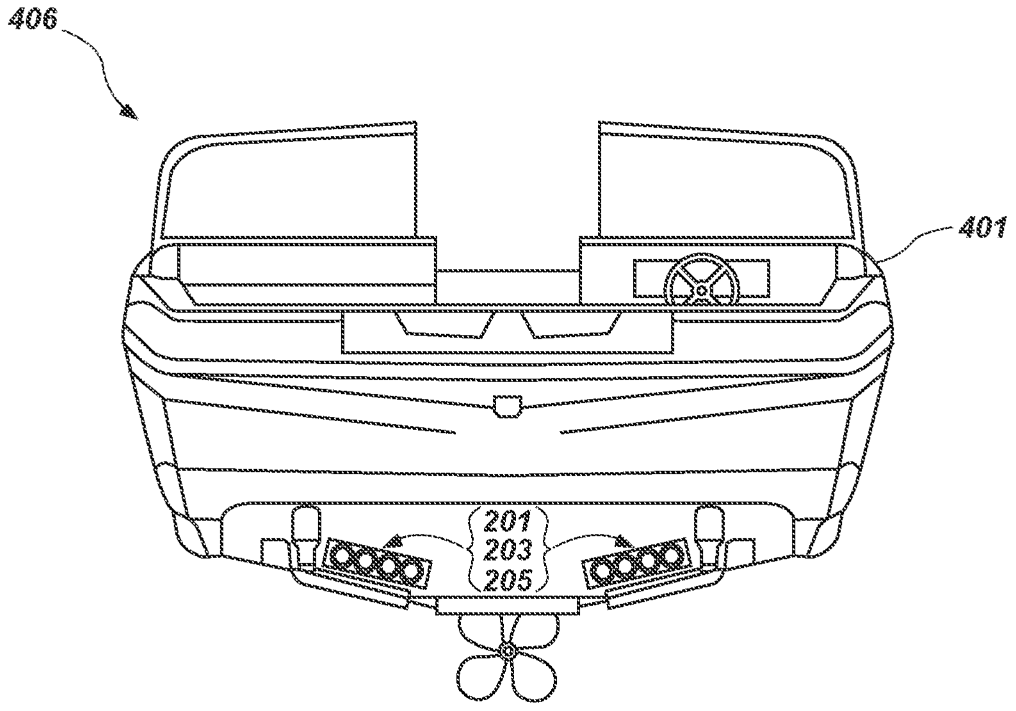
FIG. 17 shows a back view of a marine system comprising a boat including a lighting assembly according to the present invention.

Turning to FIGS. 16 and 17, FIG. 16 shows a back view and an enlarged partial view of a marine system 404 comprising a boat 400 including a lighting assembly 100, 101, or 103. As shown in FIG. 16, lighting assembly 100, 101, or 103 may be threaded into a drain port (hidden in FIG. 16) via a mounting component (e.g., mounting component 120 as shown in FIG. 3, 4, or 5). Further, FIG. 17 shows a back view of a marine system 406 comprising a boat 401 including two lighting assemblies 201, 203, or 205. Such lighting assemblies 201, 203, or 205 may be attached to boat 401 by threaded fasteners, adhesives, or any other suitable mechanism. In addition, such lighting assemblies 100, 101, 103, 201, 203, or 205 may be operably connected to electrical components within the boat 400 or 401.

Figure 18:
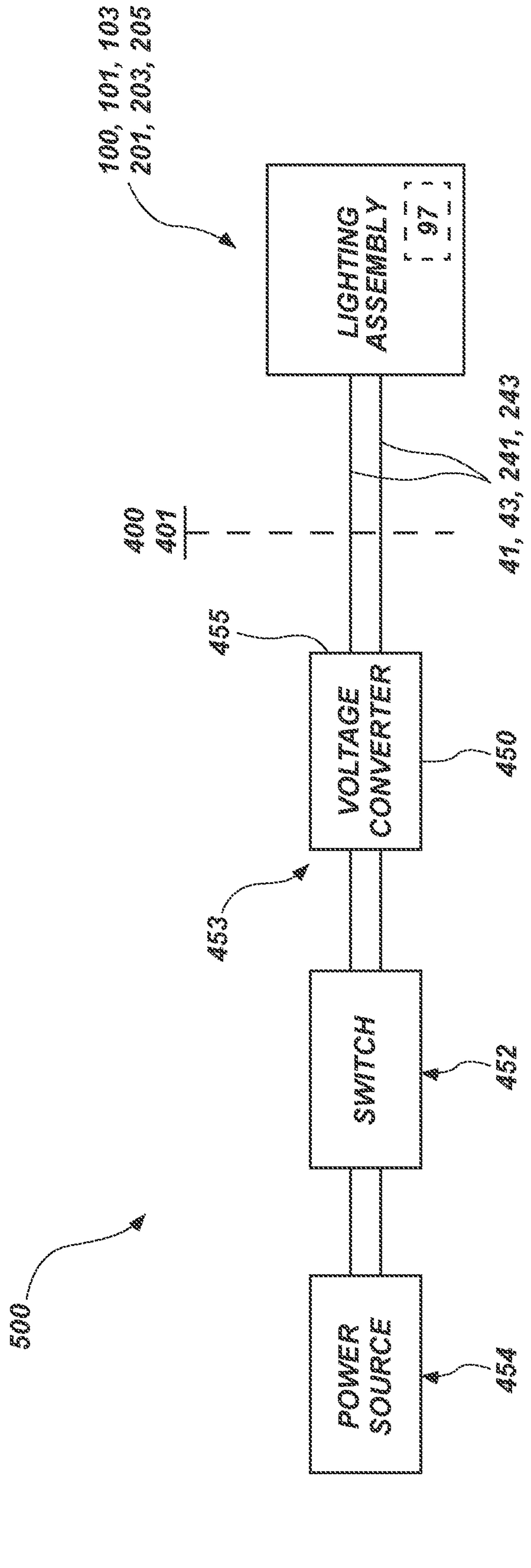
FIG. 18 shows a schematic block diagram of system 500 including at least one lighting assembly according to the present invention.

Particularly, FIG. 18 shows a schematic block diagram of a system 500 including at least one lighting assembly 100, 101, 103, 201, 203, or 205, where electrical conductors 41, 43 or 241, 243 pass from lighting assembly 100, 101, 103, 201, 203, and/or 205 through the hull (represented by the dashed line below reference numbers 400 and 401) of boat 400 or 401. Explaining further, electrical conductors may be operably connected to a voltage converter 450 (e.g., for converting from a selected voltage of alternating current to a selected voltage of direct current, for converting from a selected voltage of direct current to a selected voltage of direct current, etc.) having a power output equal to or greater than the power requirements for operating the at least one light-emitting device (e.g., at least one COB LED). In one embodiment, such voltage converter 450 may be a direct current to direct current step-up or boost converter. For example, a voltage converter 450 may convert 10-32 volts direct current at its input 453 to 12-36 volts at its output 455 (i.e., to lighting assembly 100, 101, 103, 201, 203, or 205) and may have a selected power rating (e.g., at least about 50 watts, at least about 100 watts, at least about 200 watts, at least about 300 watts, at least about 400 watts, at least about 500 watts, greater than about 500 watts, between about 100 watts and about 300 watts, or between about 300 watts and about 500 watts). Optionally, a switch 452 (e.g., a rocker-type electrical switch, such as is commercially available from Sea-Dog Line Corporation of Everett, WA) may be operably coupled to power source 454 (e.g., a 12-volt battery) and may be used to energize voltage converter 450 and thereby energize lighting assembly 100, 101, 103, 201, 203, or 205.

In further aspects of the present invention, control circuits (e.g., for controlling one or more colors of a COB LED), timing circuits, protection circuitry (e.g., protection from overheating a COB LED, protection from supplying excessive electrical current/voltage to a COB LED, etc.) may be used in combination with the lighting assemblies and systems disclosed herein. For example, lighting assembly 100, 101, 103, 201, 203, or 205 may include a thermal cutoff 97 (See, e.g., thermal cutoff 97 illustrated in FIG. 4). Furthermore, the present invention contemplates that other light-emitting devices may be included in the lighting assemblies described above. For example, in some embodiments, at least one laser diode (e.g., at least one double heterostructure laser, at least one quantum well laser, at least one quantum cascade laser, at least one separate confinement heterostructure laser, at least one distributed Bragg Reflector laser, at least one distributed feedback laser, at least one VCSEL, at least one VECSEL, or at least one external-cavity diode laser) may be included in the lighting assemblies described above. In such a configuration, the at least one laser diode may be separately wired (e.g., via electrical conductors) powered (e.g., via power sources, voltage converters, current limiters, etc.), and controlled relative to any different light-emitting devices (e.g., COB LEDs).

The preceding description has been provided to enable others skilled in the art to best utilize various aspects of the exemplary embodiments described herein. While various aspects and embodiments have been disclosed herein, other aspects and embodiments are contemplated. The various aspects and embodiments disclosed herein are for purposes of illustration and are not intended to be limiting. Accordingly, other embodiments may be within the scope of the following claims. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms “a” or “an,” as used in the specification and claims, are to be construed as meaning “at least one of.” Additionally, the words “including,” “having,” and variants thereof (e.g., “includes” and “has”) as used herein, including the claims, shall be open-ended and have the same meaning as the word “comprising” and variants thereof (e.g., “comprise” and “comprises”).

What is claimed is:

1. A lighting system, comprising:
- a first housing comprising a metal;
- a first plurality of light-emitting devices positioned within the first housing;
- a first lens element configured to receive light from the first plurality of light-emitting devices;
- a second housing, the second housing comprising the metal;
- a second plurality of light-emitting devices positioned at least partially within the second housing;
- a second lens element configured to receive light from the second plurality of light-emitting devices;
- at least one voltage converter configured to operate the first plurality of light-emitting devices and the second plurality of light-emitting devices;
- holes extending through the first housing configured for attaching the first housing to a marine vehicle and second holes extending through the second housing configured for attaching the second housing to the marine vehicle;
- a first ring-shaped retaining element secured to the first housing and retaining the first lens element, wherein a first sealant element is compressed between the first ring-shaped retaining element and the first lens element and forms a first liquid-tight seal;
- a second ring-shaped retaining element secured to the second housing and retaining the second lens element, wherein a second sealant element is compressed between the second ring-shaped retaining element and the second lens element and forms a second liquid-tight seal;
- wherein:
  - the first housing is a single body;
  - each of the light-emitting devices comprises a light-emitting area;
  - the light-emitting devices collectively have a power consumption of greater than 90 watts;
  - the at least one voltage converter is external to the first housing and the second housing; and
  - the at least one voltage converter has a power output of between 50 watts and 500 watts.

2. The lighting assembly according to claim 1, further comprising wiring configured for electrically connecting the first light-emitting devices and the second plurality of light-emitting devices to the at least one voltage converter, wherein the wiring is configured to extend from a transom of a boat through a hull of the boat.

3. The lighting assembly according to claim 1, wherein each of the light-emitting devices further comprises a metal substrate.

4. The lighting assembly according to claim 3, wherein each light-emitting area is centrally positioned on a respective metal substrate.

5. The lighting assembly according to claim 1, further comprising a protection circuitry configured to protect from overheating at least one of the light-emitting devices.

6. The lighting assembly according to claim 5, wherein:
- at least a first one of the light-emitting devices is configured to emit red light;
- at least a second one of the light-emitting devices is configured to emit green light; and
  - at least a third one of the light-emitting devices is configured to emit blue light.

7. The lighting assembly according to claim 1, wherein at least one of the light-emitting devices comprises a chip-on-board light-emitting device.

8. The lighting system according to claim 1, wherein
- the first housing comprises aluminum;
- the first housing further comprises an electrical passageway; and
- the first lens element further comprises a concave surface.

9. The lighting assembly according to claim 1, further comprising a heat sink in thermal contact with at least one of the light-emitting devices.

10. The lighting assembly according to claim 1, wherein the first housing has an outer surface with a generally cylindrical shape or a generally cubic shape.

11. The lighting assembly according to claim 1, wherein: the first housing includes at least one port configured to allow an ambient environment to contact at least one of the first plurality of light-emitting devices; and greater than 30% of the upper surface of the at least one of the first plurality of light-emitting devices is covered by a light-emitting area.

12. A lighting system, comprising:

a first housing comprising a metal;

a first plurality of light-emitting devices positioned within the first housing;

a first lens element configured to receive light from the first plurality of light-emitting devices;

protection circuitry configured to protect from overheating at least one of the first plurality of light-emitting devices;

a second housing, the second housing comprising the metal;

a second plurality of light-emitting devices positioned within the second housing;

a second lens element configured to receive light from the second plurality of light-emitting devices;

at least one voltage converter configured to operate the plurality of first light-emitting devices and the second plurality of light-emitting devices;

holes extending through the first housing configured for attaching the first housing to a marine vehicle and second holes extending through the second housing configured for attaching the second housing to the marine vehicle;

a first retaining element secured to the first housing and retaining the first lens element, wherein a first sealant element is compressed between the first retaining element and the first lens element and forms a first liquid-tight seal;

a second retaining element secured to the second housing and retaining the second lens element, wherein a second sealant element is compressed between the second retaining element and the second lens element and forms a second liquid-tight seal;

wherein:

each of the light-emitting devices comprises a light emitting area;

the first plurality of light-emitting devices collectively have a power consumption of greater than 90 watts;

the second plurality of light-emitting devices collectively have a power consumption of greater than 90 watts;

the at least one voltage converter is external to the first housing and the second housing; and the at least one voltage converter has a power output of between 180 watts and 500 watts.

13. The lighting assembly according to claim 12, further comprising wiring configured for electrically connecting the first plurality of light-emitting device and the second plurality of light-emitting device to the at least one voltage converter, wherein the wiring is configured to extend from a transom of a boat through a hull of the boat.

14. The lighting assembly according to claim 13, wherein at least one of the light-emitting devices includes a soldered electrical connection.

15. The lighting assembly according to claim 12, wherein the first lens element further comprises a concave surface.

16. The lighting assembly according to claim 13, wherein:

at least a first one of the light-emitting devices is configured to emit red light;

at least a second one of the light-emitting devices is configured to emit green light; and at least a third one of the light-emitting devices is configured to emit blue light.

17. The lighting assembly according to claim 14, wherein at least one of the light-emitting devices further comprises at least one of electrical tabs or solder pads.

18. The lighting system according to claim 12, wherein greater than 30% of an upper surface of at least one of the light-emitting devices is covered by the light-emitting area.

19. The lighting assembly according to claim 12, wherein the first housing includes at least one port configured to allow an ambient environment to contact at least one of the first plurality of light-emitting devices.

20. A lighting system, comprising:

a housing comprising a metal;

a first plurality of light-emitting devices positioned within the housing;

a second plurality of light-emitting devices positioned within the housing;

a first lens element configured to receive light from the first plurality of light-emitting devices;

a second lens element configured to receive light from the second plurality of light-emitting devices;

at least one voltage converter configured to operate the light-emitting devices;

holes extending through the housing configured for attaching the housing to a marine vehicle;

a first retaining element secured to the housing and retaining the first lens element, wherein a first sealant element is compressed between the first retaining element and the first lens element and forms a first liquid-tight seal;

a second retaining element secured to the housing and retaining the second lens element, wherein a second sealant element is compressed between the second retaining element and the second lens element and forms a second liquid-tight seal;

wherein:

the housing is a single body;

each of the light-emitting devices comprises a light emitting area;

the light-emitting devices collectively have a power consumption of greater than 90 watts;

the at least one voltage converter is external to the housing; and the at least one voltage converter has a power output of between 90 watts and 500 watts.

21. The lighting assembly according to claim 20, wherein:

at least a first one of the light-emitting devices is configured to emit red light;

at least a second one of the light-emitting devices is configured to emit green light; and at least a third one of the light-emitting devices is configured to emit blue light.

22. The lighting system according to claim 21, wherein:

at least a fourth one of the plurality of light-emitting device further comprises at least one of electrical tabs or solder pads; and the lighting system further comprises protection circuitry configured to protect from overheating at least the fourth one of the plurality of light-emitting devices.

23. The lighting assembly according to claim 20, wherein the housing includes at least one port configured to allow an ambient environment to contact at least one of the plurality of light-emitting devices.

* * * * *